US012327358B2

(12) United States Patent
Lu et al.

(10) Patent No.: US 12,327,358 B2
(45) Date of Patent: Jun. 10, 2025

(54) METHOD FOR RECONSTRUCTING DENDRITIC TISSUE IN IMAGE, DEVICE AND STORAGE MEDIUM

(71) Applicant: Tencent Technology (Shenzhen) Company Limited, Shenzhen (CN)

(72) Inventors: Donghuan Lu, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 408 days.

(21) Appl. No.: 17/964,705

(22) Filed: Oct. 12, 2022

(65) Prior Publication Data

US 2023/0032683 A1 Feb. 2, 2023

Related U.S. Application Data

(63) Continuation of application No. PCT/CN2021/121600, filed on Sep. 29, 2021.

(30) Foreign Application Priority Data

Nov. 9, 2020 (CN) .......................... 202011238994.2

(51) Int. Cl.
*G06T 7/10* (2017.01)
*G06F 18/25* (2023.01)
(Continued)

(52) U.S. Cl.
CPC ............... *G06T 7/10* (2017.01); *G06F 18/25* (2023.01); *G06N 3/045* (2023.01); *G06N 3/084* (2013.01);
(Continued)

(58) Field of Classification Search
CPC ...... G06F 18/25; G06N 3/045; G06N 3/0455; G06N 3/0464; G06N 3/0475; G06N 3/082;
(Continued)

(56) References Cited

U.S. PATENT DOCUMENTS 11,847,547 B2 * 12/2023 Wang ........................ G06N 3/08
2008/0282362 A1 * 11/2008 Brulet ................ A61K 49/0045
800/282

(Continued)

FOREIGN PATENT DOCUMENTS

| CN | 107862695 A | 3/2018 |
| CN | 109345538 A | 2/2019 |

(Continued)

OTHER PUBLICATIONS

Maximilian Joesch et al., "Reconstruction of genetically identified neurons imaged by serial-section electron microscopy," Jul. 7, 2016, eLife,2016,Cell Biology|Neuroscience, pp. 1-10.*

(Continued)

*Primary Examiner* — Omar S Ismail
(74) *Attorney, Agent, or Firm* — Morgan, Lewis & Bockius LLP

(57) ABSTRACT

This application discloses a method for reconstructing a dendritic tissue in an image performed by a computer device. The method includes: acquiring original image data corresponding to a target image of a target dendritic tissue and corresponding reconstruction reference data determined based on a local reconstruction result of the target dendritic tissue in the target image; applying a target segmentation model to the original image data and the reconstruction reference data to acquire a target segmentation result for indicating a target category of each pixel in the target image, and the target category of any pixel being used for indicating (Continued)

whether the pixel belongs to the target dendritic tissue or not; and reconstructing the target dendritic tissue in the target image based on the target segmentation result to obtain a complete reconstruction result of the target dendritic tissue in the target image.

17 Claims, 11 Drawing Sheets

(51) Int. Cl.
*G06N 3/045* (2023.01)
*G06N 3/084* (2023.01)

(52) U.S. Cl.
CPC ............ *G06T 2207/20081* (2013.01); *G06T 2207/20084* (2013.01); *G06T 2207/20221* (2013.01); *G06T 2207/30016* (2013.01)

(58) Field of Classification Search
CPC ............ G06N 3/084; G06N 3/094; G06T 2207/20081; G06T 2207/20084; G06T 2207/20221; G06T 2207/30016; G06T 7/10; G06T 7/11; G06V 10/454; G06V 10/764; G06V 10/80; G06V 10/82; G06V 2201/03
See application file for complete search history.

(56) References Cited

U.S. PATENT DOCUMENTS

| | | | | |
|---|---|---|---|---|
| 2009/0297017 | A1* | 12/2009 | Hudgings | G06T 7/001 348/311 |
| 2011/0305717 | A1* | 12/2011 | Gorvell | C12N 5/0639 424/94.1 |
| 2013/0336557 | A1* | 12/2013 | Cruzat | A61K 38/13 382/128 |
| 2014/0254899 | A1* | 9/2014 | Dai | G06T 7/187 382/128 |
| 2016/0305947 | A1* | 10/2016 | Pierce | C07K 16/2818 |
| 2016/0314335 | A1* | 10/2016 | Al-Kofahi | G06T 7/187 |
| 2016/0335515 | A1 | 11/2016 | Juveneton et al. | |
| 2017/0160171 | A1* | 6/2017 | Tsujikawa | G01N 1/44 |
| 2018/0045622 | A1* | 2/2018 | Deisseroth | G01N 33/4833 |
| 2018/0245079 | A1* | 8/2018 | Lieberman Aiden | C12N 15/11 |
| 2019/0080456 | A1 | 3/2019 | Song et al. | |
| 2019/0246874 | A1* | 8/2019 | Kamon | A61B 1/0676 |
| 2019/0303760 | A1* | 10/2019 | Kumar | G06V 10/82 |
| 2019/0325579 | A1 | 10/2019 | Wang et al. | |
| 2020/0152289 | A1* | 5/2020 | Cleary | C12Q 1/6841 |
| 2020/0234442 | A1* | 7/2020 | Barnes | C12Q 1/6886 |
| 2020/0380672 | A1* | 12/2020 | Clark | G06T 7/143 |
| 2021/0205479 | A1* | 7/2021 | Tsien | C07C 49/255 |
| 2021/0268072 | A1* | 9/2021 | Ciani | A61K 9/0019 |
| 2021/0312620 | A1* | 10/2021 | Zuo | G01N 1/30 |
| 2022/0019865 | A1* | 1/2022 | Rabe | G06T 7/11 |
| 2022/0036971 | A1* | 2/2022 | Yoo | G16H 30/40 |

FOREIGN PATENT DOCUMENTS

| | | | |
|---|---|---|---|
| CN | 109871896 | A | 6/2019 |
| CN | 110009656 | A | 7/2019 |
| CN | 110533113 | A | 12/2019 |
| CN | 111612068 | A | 9/2020 |
| CN | 111696089 | A | 9/2020 |
| CN | 112037305 | A | 12/2020 |

OTHER PUBLICATIONS

Yutaro Kashiwagi et al., "Computational geometry analysis of dendritic spines by structured illumination microscopy," Mar. 20, 2019, Nature Communications | (2019) 10:1285, pp. 1-10.*
Shigeo Okabe,"Recent advances in computational methods for measurement of dendritic spines imaged by light microscopy," Apr. 3, 2020, Microscopy, 2020,pp. 196-209.*
Firdaus Janoos,"Robust 3D reconstruction and identification of dendritic spines from optical microscopy imaging," Jul. 24, 2008, Medical Image Analysis 13 (2009),pp. 167-175.*
Anna Kreshuk et al. ,"Automated Detection of Synapses in Serial Section Transmission Electron Microscopy Image Stacks," Feb. 6, 2014,PLOS One,Feb. 2014,vol. 9,Issue 2,e87351—pp. 1-10.*
Tencent Technology, WO, PCT/CN2021/121600, Dec. 29, 2021, 5 pgs.
Tencent Technology, IPRP, PCT/CN2021/121600, May 8, 2023, 6 pgs.
Jaemin Son et al., "Retinal Vessel Segmentation in Fundoscopic Images with Generative Adversarial Networks", Arxiv.org, Cornell University Library, New York, Jun. 28, 2017, XP080959127, 9 pgs.
Tencent Technology, Extended European Search Report, EP21888337. 9, Dec. 5, 2023, 10 pgs.
Tencent Technology, ISR, PCT/CN2021/121600, Dec. 29, 2021, 3 pgs.

* cited by examiner

| id | Type | x | y | z | r | pid |
|---|---|---|---|---|---|---|
| 1 | 2 | 14634.6 | 16704.9 | 3370.4 | 1 | -1 |
| 2 | 2 | 12398 | 20670 | 4336.44 | 1 | 3 |
| 3 | 2 | 12398.4 | 20665.2 | 4335.72 | 1 | 4 |
| 4 | 2 | 12399.8 | 20660.7 | 4334.49 | 1 | 5 |
| 5 | 2 | 12400 | 20655.7 | 4334.05 | 1 | 6 |
| 6 | 2 | 12399.3 | 20651 | 4333.09 | 1 | 7 |
| 7 | 2 | 12398 | 20646.3 | 4332.23 | 1 | 8 |
| 8 | 2 | 12398 | 20641.6 | 4330.6 | 1 | 9 |
| 9 | 2 | 12398 | 20636.8 | 4329.03 | 1 | 10 |
| 10 | 2 | 12398.1 | 20631.9 | 4328.11 | 1 | 11 |
| 11 | 2 | 12399.8 | 20627.6 | 4326.43 | 1 | 12 |
| 12 | 2 | 12399.9 | 20622.6 | 4326.29 | 1 | 13 |
| 13 | 2 | 12400 | 20617.7 | 4325.34 | 1 | 14 |
| 14 | 2 | 12399.1 | 20613 | 4324.45 | 1 | 15 |
| 15 | 2 | 12398.2 | 20608.3 | 4323.54 | 1 | 16 |
| 16 | 2 | 12398.9 | 20603.5 | 4322.57 | 1 | 17 |
| 17 | 2 | 12400 | 20598.7 | 4322.44 | 1 | 18 |
| 18 | 2 | 12400 | 20593.7 | 4322.44 | 1 | 19 |
| 19 | 2 | 12400 | 20588.8 | 4321.64 | 1 | 20 |
| 20 | 2 | 12400 | 20583.9 | 4320.44 | 1 | 21 |
| 21 | 2 | 12400 | 20578.9 | 4320.35 | 1 | 22 |
| 22 | 2 | 12400 | 20573.9 | 4320.25 | 1 | 23 |
| 23 | 2 | 12400 | 20569.1 | 4319.32 | 1 | 24 |
| 24 | 2 | 12400 | 20564.3 | 4317.94 | 1 | 25 |
| 25 | 2 | 12400 | 20559.4 | 4316.65 | 1 | 26 |

FIG. 9

METHOD FOR RECONSTRUCTING DENDRITIC TISSUE IN IMAGE, DEVICE AND STORAGE MEDIUM

CROSS-REFERENCE TO RELATED APPLICATIONS

This application is a continuation application of PCT Patent Application No. PCT/CN2021/121600, entitled "METHOD FOR RECONSTRUCTING TREE-SHAPED TISSUE IN IMAGE, AND DEVICE AND STORAGE MEDIUM" filed on Sep. 29, 2021, which claims priority to Chinese Patent Application No. 202011238994.2, filed with the State Intellectual Property Office of the People's Republic of China on Nov. 9, 2020, and entitled "METHOD FOR RECONSTRUCTING DENDRITIC TISSUE IN IMAGE, DEVICE AND STORAGE MEDIUM", all of which are incorporated herein by reference in their entirety.

FIELD OF THE TECHNOLOGY

Embodiments of this application relate to the technical field of computers, and in particular to a method for reconstructing a dendritic tissue in an image, a device and a storage medium.

BACKGROUND OF THE DISCLOSURE

Dendritic tissues are tissues with dendritic structures in living organisms, such as neurons and blood vessels in the human body. Reconstruction of a dendritic tissue in an image refers to marking the dendritic tissues in the image containing the dendritic tissues, so as to obtain a reconstruction result of the dendritic tissue. The reconstruction of the dendritic tissue in the image can provide key data for the realization of artificial intelligence.

In the related art, the reconstruction of the dendritic tissue in the image is performed manually by annotators, the reconstruction efficiency is low, and the reliability of the obtained reconstruction result of the dendritic tissue is poor.

SUMMARY

Embodiments of this application provide a method for reconstructing a dendritic tissue in an image, a device and a storage medium, which can be used for improving the efficiency of reconstructing the dendritic tissue in the image.

In one aspect, an embodiment of this application provides a method for reconstructing a dendritic tissue in an image. The method includes:

acquiring original image data corresponding to a target image of a target dendritic tissue and reconstruction reference data corresponding to the target image, the reconstruction reference data being determined based on a local reconstruction result of the target dendritic tissue in the target image;

applying a target segmentation model to the original image data and the reconstruction reference data to acquire a target segmentation result corresponding to the target image, the target segmentation result being used for indicating a target category of each pixel in the target image, and the target category of any pixel being used for indicating that the pixel belongs to the target dendritic tissue or that the pixel does not belong to the target dendritic tissue; and reconstructing the target dendritic tissue in the target image based on the target segmentation result to obtain a complete reconstruction result of the target dendritic tissue in the target image.

In another aspect, an apparatus for reconstructing a dendritic tissue in an image is provided. The apparatus includes:

a first acquiring unit, configured to acquire original image data corresponding to a target image of a target dendritic tissue and reconstruction reference data corresponding to the target image, the reconstruction reference data being determined based on a local reconstruction result of the target dendritic tissue in the target image;

a second acquiring unit, configured to apply a target segmentation model to the original image data and the reconstruction reference data to acquire a target segmentation result corresponding to the target image, the target segmentation result being used for indicating a target category of each pixel in the target image, and the target category of any pixel being used for indicating that the pixel belongs to the target dendritic tissue or that the pixel does not belong to the target dendritic tissue; and a reconstruction unit, configured to reconstruct the target dendritic tissue in the target image based on the target segmentation result to obtain a complete reconstruction result of the target dendritic tissue in the target image.

According to another aspect, a computer device is provided, including a processor and a memory, the memory storing at least one program code loaded and executed by the processor and causing the computer device to implement the method for reconstructing a dendritic tissue in an image described in any one of the foregoing.

According to another aspect, a non-transitory computer-readable storage medium is provided, storing at least one segment of program code, the at least one segment of program code being loaded and executed by a processor of a computer device and causing the computer device to implement the method for reconstructing a dendritic tissue in an image according to any one of the foregoing.

According to another aspect, a computer program product or a computer program is further provided, the computer program product or the computer program including computer instructions, the computer instructions being stored in a computer-readable storage medium. A processor of the computer device reads the computer instructions from the computer-readable storage medium and executes the computer instructions to cause the computer device to perform the method for reconstructing a dendritic tissue in an image described in the foregoing aspects.

The technical solutions provided in the embodiments of this application may bring the following beneficial effects:

In the embodiments of this application, the target segmentation result corresponding to the target image is automatically acquired based on the original image data and reconstruction reference data corresponding to the target image, and then the complete reconstruction result of the target dendritic tissue in the target image is automatically obtained based on the target segmentation result. In this way, automatic reconstruction of the dendritic tissue can be realized, and the reconstruction process of the dendritic tissue does not need to relay on manual labor, which is beneficial to improving the efficiency of reconstructing the dendritic tissue in the image, and the reliability of the obtained reconstruction result of the dendritic tissue is relatively high.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 9 is a schematic diagram of an SWC file for storing a complete reconstruction result of neurons provided by an embodiment of this application.

DESCRIPTION OF EMBODIMENTS

To make objectives, technical solutions, and advantages of this application clearer, the following further describes implementations of this application in detail with reference to the accompanying drawings.

Figure 1:
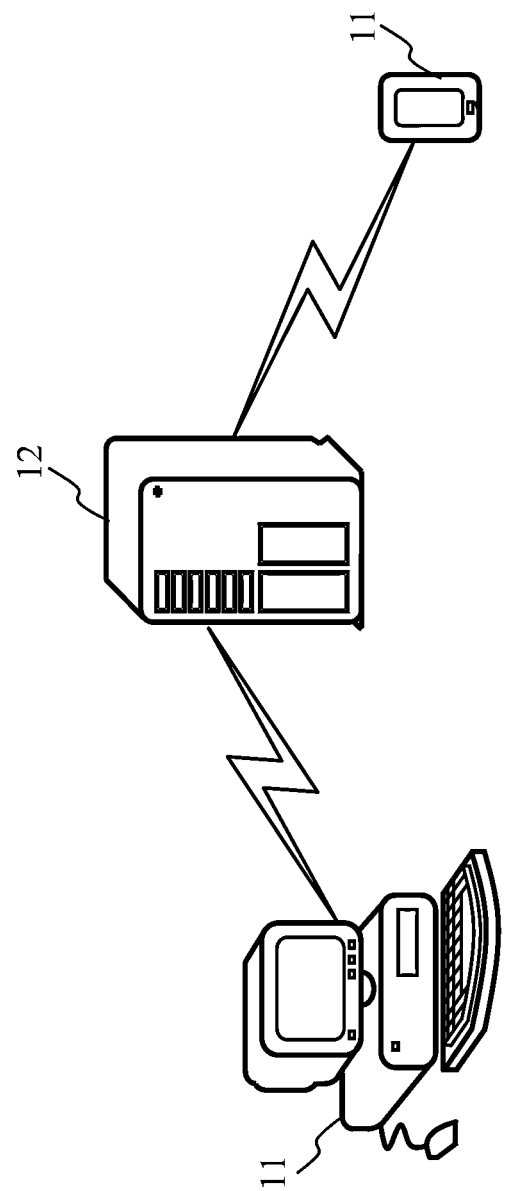
FIG. 1 is a schematic diagram of an implementation environment of a method for reconstructing a dendritic tissue in an image provided by an embodiment of this application.

An embodiment of this application provides a method for reconstructing a dendritic tissue in an image. Referring to FIG. 1, it illustrates a schematic diagram of an implementation environment of a method for reconstructing a dendritic tissue in an image provided by an embodiment of this application. The implementation environment includes a terminal 11 and a server 12.

The method for reconstructing the dendritic tissue in the image provided by the embodiments of this application is executed by the terminal 11 or by the server 12, which is not limited in the embodiments of this application. Exemplarily, in the case where the method for reconstructing the dendritic tissue in the image provided by the embodiments of this application is executed by the terminal 11, after a complete reconstruction result of a target dendritic tissue in a target image is obtained, the terminal 11 may display the complete reconstruction result of the target dendritic tissue in the target image. The terminal 11 may also send the complete reconstruction result of the target dendritic tissue in the target image to the server 12 for storage.

Exemplarily, in the case where the method for reconstructing the dendritic tissue in the image provided by the embodiments of this application is executed by the server 12, after the complete reconstruction result of the target dendritic tissue in the target image is obtained, the server 12 may send the complete reconstruction result of the dendritic tissue in the target image to the terminal 11 for display.

In a possible implementation, the terminal 11 is a smartphone, a tablet computer, a notebook computer, a desktop computer, a smart speaker, a smartwatch, or the like, but is not limited thereto. The server 12 is an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal 11 and the server 12 are directly or indirectly connected in a wired or wireless communication manner. This is not limited in this application.

It is to be appreciated by a person skilled in the art that the terminal 11 and the server 12 are only examples. If other existing or future possible terminals or servers are applicable to this application, such terminals or servers also fall within the protection scope of this application, and are incorporated herein by reference.

Figure 2:
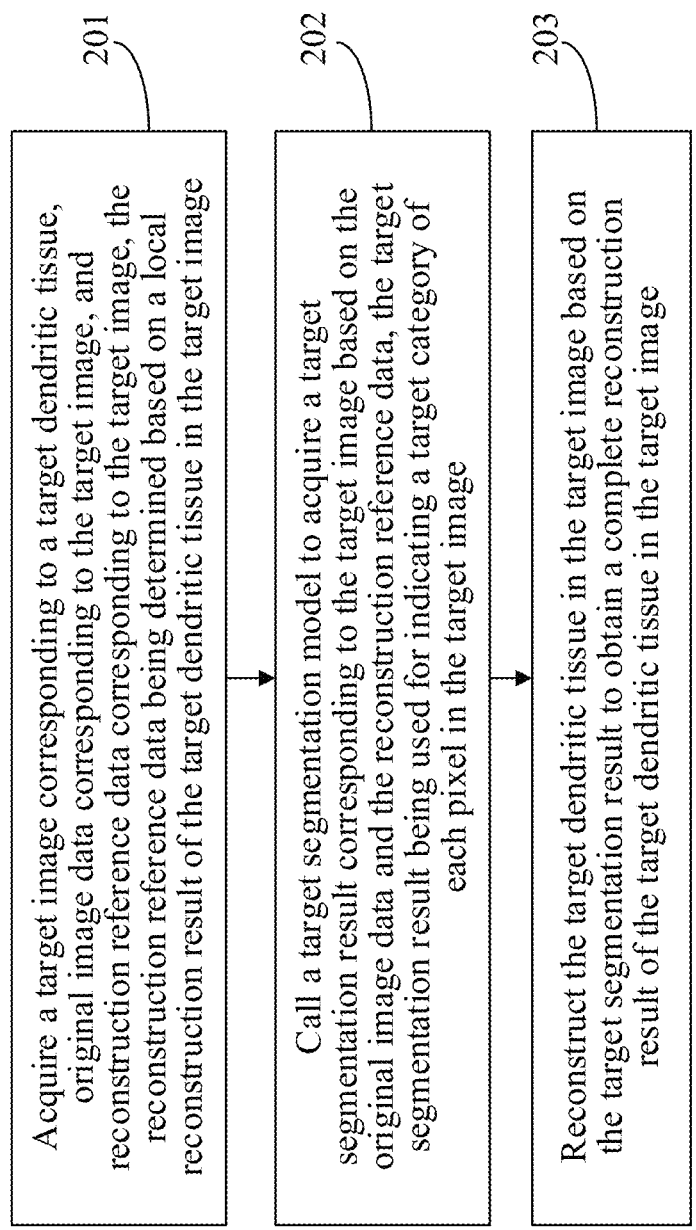
FIG. 2 is a flowchart of a method for reconstructing a dendritic tissue in an image provided by an embodiment of this application.

Based on the implementation environment illustrated in FIG. 1 above, an embodiment of this application provides a method for reconstructing a dendritic tissue in an image, taking the method applied to the server 12 as an example. As shown in FIG. 2, the method provided by the embodiments of this application includes the following steps 201 to 203.

Step 201, Acquire a target image corresponding to a target dendritic tissue, original image data corresponding to the target image, and reconstruction reference data corresponding to the target image, the reconstruction reference data being determined based on a local reconstruction result of the target dendritic tissue in the target image.

The target dendritic tissue refers to any dendritic tissue to be reconstructed. The dendritic tissue refers to a tissue of a dendritic structure in a living organism. The type of the dendritic tissue to be reconstructed is not limited in the embodiments of this application. Exemplarily, the dendritic tissue to be reconstructed refers to neurons in the human body, or the dendritic tissue to be reconstructed refers to blood vessels in the human body, and the like. Neurons are basic units that constitute the structure and function of the nervous system. When the dendritic tissue to be reconstructed refers to neurons, reconstruction of the dendritic tissue refers to reconstruction of neurons. The reconstruction of neurons is one of the keys to establishing big data in brain science and understanding human intelligence and emotions.

The target image corresponding to the target dendritic tissue refers to an image in which a complete or local target dendritic tissue is included and the included complete or local target dendritic tissue is not completely reconstructed. Through the method for reconstructing the dendritic tissue in the image, the complete or local target dendritic tissue contained in the target image can be completely reconstructed, so as to obtain a complete reconstruction result of the target dendritic tissue in the target image.

In a possible implementation, the target image is acquired from an initial image including the complete target dendritic tissue, and the initial image may be a two-dimensional image or a three-dimensional image, which is not limited in the embodiments of this application. In one embodiment, the target image may be acquired from an initial image including part of the target dendritic tissue. In an exemplary embodiment, when the target dendritic tissue is a target neuron, an initial image including the target neuron is a three-dimensional brain image, that is, the target image is acquired from the three-dimensional brain image including the target neuron. In an exemplary embodiment, when the target dendritic tissue is a target blood vessel, an initial image including the target blood vessel is a three-dimensional blood vessel image, that is, the target image is acquired from the three-dimensional blood vessel image including the target blood vessel.

In a possible implementation, the process of acquiring the target image corresponding to the target dendritic tissue includes the following steps 2011 to 2013.

Step 2011: Acquire an initial reconstruction result of the target dendritic tissue in the initial image.

The initial reconstruction result of the target dendritic tissue in the initial image refers to a result obtained after preliminary reconstruction of the target dendritic tissue in the initial image. The embodiments of this application does not limit the representation of the initial reconstruction result of the target dendritic tissue in the initial image. Exemplarily, the initial reconstruction result of the target dendritic tissue in the initial image refers to an image marked with initial reconstruction nodes and a connection relationship among the initial reconstruction nodes. Alternatively, the initial reconstruction result of the target dendritic tissue in the initial image refers to a file including relevant data of the initial reconstruction nodes. The relevant data of any initial reconstruction node includes, but is not limited to, position data of the initial reconstruction node in the initial image, association data between the initial reconstruction node and other initial reconstruction nodes, and the like. The association data between any initial reconstruction node and other initial reconstruction nodes is used for indicating a connection relationship between the initial reconstruction node and other initial reconstruction nodes.

The initial reconstruction nodes refer to reconstruction nodes marked after preliminary reconstruction of the target dendritic tissue in the initial image. Each initial reconstruction node corresponds to a pixel belonging to the target dendritic tissue in the initial image.

In an exemplary embodiment, the initial reconstruction result of the target dendritic tissue in the initial image is a result obtained after performing preliminary reconstruction on the target dendritic tissue starting from a starting pixel in the initial image. The embodiments of this application does not limit the position of the starting pixel. Exemplarily, assuming that the initial image refers to a three-dimensional image in a three-dimensional coordinate system and a corner of the initial image is located at the origin of the three-dimensional coordinate system, the starting pixel refers to a pixel with three-dimensional coordinates being (0, 0, 0) in the initial image.

In a possible implementation, manners for obtaining the initial reconstruction result of the target dendritic tissue in the initial image include, but are not limited to, the following three manners.

Manner 1: Extract the initial reconstruction result of the target dendritic tissue in the initial image directly.

Manner 1 occurs when the initial reconstruction result of the target dendritic tissue in the initial image is acquired and stored in advance.

Manner 2: Acquire the initial reconstruction result, obtained by manual marking, of the target dendritic tissue in the initial image.

Manner 2 occurs when the initial reconstruction result of the target dendritic tissue in the initial image is not acquired or stored in advance. When the initial reconstruction result of the target dendritic tissue in the initial image is not acquired or stored in advance, the initial reconstruction result of the target dendritic tissue in the initial image is acquired by manually marking the initial reconstruction nodes of the target dendritic tissue and the connection relationship among the initial reconstruction nodes in the initial image.

Exemplarily, the process of manually marking the initial reconstruction nodes of the target dendritic tissue and the connection relationship among the initial reconstruction nodes is: manually and continuously determine k (k is an integer greater than 1) pixels belonging to the target dendritic tissue in the initial image, mark the k pixels as the initial reconstruction nodes of the target dendritic tissue, and establish the connection relationship among the marked initial reconstruction nodes according to an overall trend of the target dendritic tissue. In an exemplary embodiment, in the process of continuously determining k pixels belonging to the target dendritic tissue, whether each pixel belongs to the target dendritic tissue is sequentially determined beginning from the starting pixel in the initial image.

Manner 3: Acquire the initial reconstruction result of the target dendritic tissue in the initial image provided by a third party.

Manner 3 occurs when the third party, that is, a service provider that provides the initial reconstruction result stores the initial reconstruction result of the target dendritic tissue in the initial image.

Step 2012: Determine pixels belonging to the target dendritic tissue in the initial image based on the initial reconstruction result of the target dendritic tissue in the initial image, and determine a pixel meeting a condition in the pixels belonging to the target dendritic tissue.

Initial reconstruction nodes of the target dendritic tissue that has been reconstructed in the initial image may be determined according to the initial reconstruction result of the target dendritic tissue in the initial image, and each initial reconstruction node of the target dendritic tissue corresponds to one pixel belonging to the target dendritic tissue in the initial image. The pixels corresponding to the initial reconstruction nodes of the target dendritic tissue that has been reconstructed in the initial image are used as the pixels belonging to the target dendritic tissue, and then the pixel meeting the condition is determined from the pixels belonging to the target dendritic tissue.

The condition is set according to experience or flexibly adjusted according to application scenarios, which is not limited in the embodiments of this application. Exemplarily, for the case where the initial reconstruction result of the target dendritic tissue in the initial image is the result obtained after performing preliminary reconstruction on the target dendritic tissue starting from the starting pixel in the initial image, the pixel meeting the condition refers to a pixel farthest from the starting pixel of the initial image in the pixels belonging to the target dendritic tissue.

Step 2013: Intercept an image of a target size from the initial image as the target image by taking the pixel meeting the condition as a center point.

The target size is set according to experience, or flexibly adjusted according to available computing resources, which is not limited in the embodiments of this application. Exemplarily, for the case where the initial image is a three-dimensional image, the target size is 32×32×32 (in pixels). The target image may be obtained by intercepting an image of the target size from the initial image by taking the pixel meeting the condition as the center point.

Steps 2011 to 2013 above are only an exemplary description of the manner for acquiring the target image corresponding to the target dendritic tissue, and the embodiments of this application is not limited thereto. In an exemplary embodiment, a manner for acquiring the target image corresponding to the target dendritic tissue is: determine any pixel belonging to the target dendritic tissue in the initial image, and intercept an image of the target size as the target image by taking the pixel as the center point. In an embodiment, a manner for acquiring the target image corresponding to the target dendritic tissue is: determine a specified pixel belonging to the target dendritic tissue in the initial image, and intercept an image of the target size as the target image by taking the specified pixel as the center point, the specified pixel is preset.

Figure 3:
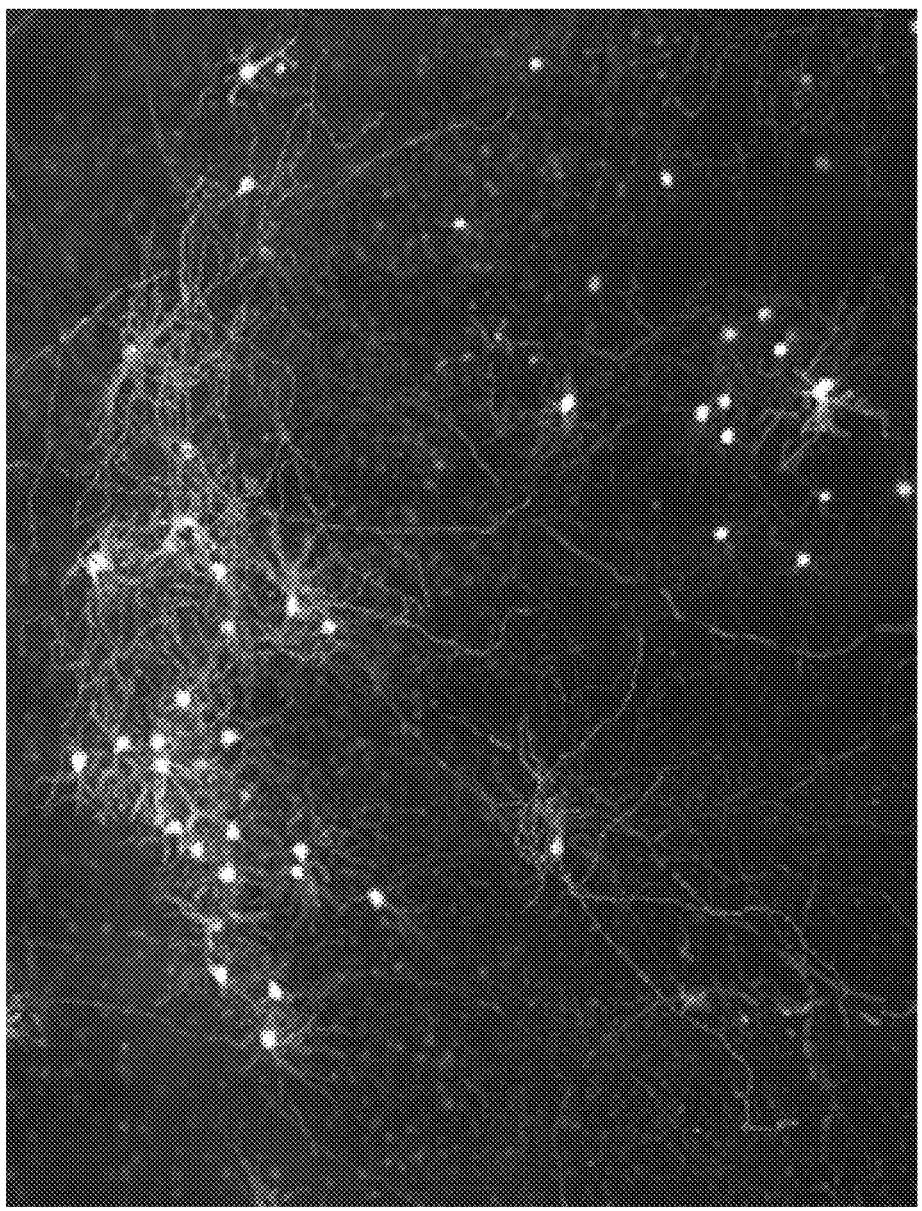
FIG. 3 is a schematic diagram of an image including a neuron provided by an embodiment of this application.

In an exemplary embodiment, the target image is a local image in the initial image. Taking the dendritic tissue being neurons as an example, a three-dimensional image corresponding to the neurons occupies too much space, and the neurons are sparse in the image (as shown in FIG. 3), so that there may be a lot of redundant information in the three-dimensional image, and the problems of low reconstruction efficiency and poor reconstruction accuracy may be caused when the whole image is reconstructed directly. Therefore, in the embodiments of this application, the reconstruction of the dendritic tissue is performed on the basis of the local image, which is beneficial to improving the reconstruction efficiency and reconstruction accuracy.

After the target image corresponding to the target dendritic tissue is acquired, the original image data corresponding to the target image and the reconstruction reference data corresponding to the target image are further acquired. Next, related contents of acquiring the original image data corresponding to the target image and the reconstruction reference data corresponding to the target image are introduced respectively.

The original image data corresponding to the target image is used for characterizing original image features of the target image. In an exemplary embodiment, a manner for acquiring the original image data corresponding to the target image is: acquire grayscale features of each pixel in the target image; and determine the original image data corresponding to the target image based on the grayscale features of each pixel. Exemplarily, the grayscale feature of any pixel is determined based on a grayscale value of the pixel in the target image, for example, the grayscale value of any pixel in the target image is used as the grayscale feature of the pixel; or, the grayscale value of any pixel in the target image is normalized to obtain a normalized value as the grayscale feature of the pixel.

In an exemplary embodiment, when the target image is the three-dimensional image, the original image data corresponding to the target image is three-dimensional data, and the three-dimensional original image data includes the grayscale features of each pixel in the target image.

The reconstruction reference data corresponding to the target image is used for providing data reference for the reconstruction process of the target dendritic tissue in the target image. The reconstruction reference data is determined based on the local reconstruction result of the target dendritic tissue in the target image. That is to say, before acquiring the reconstruction reference data corresponding to the target image, the local reconstruction result of the target dendritic tissue in the target image needs to be acquired first.

The local reconstruction result of the target dendritic tissue in the target image may provide data reference for the reconstruction process of acquiring the complete reconstruction result of the target dendritic tissue in the target image. In an exemplary embodiment, for the case where the target image corresponding to the target dendritic tissue is determined based on the initial reconstruction results of the target dendritic tissue in the initial image, a manner for acquiring the local reconstruction result of the target dendritic tissue in the target image is: determine an initial reconstruction result corresponding to the target image from the initial reconstruction results of the target dendritic tissue in the initial image; and determine the local reconstruction result of the target dendritic tissue in the target image based on the initial reconstruction result corresponding to the target image.

In a possible implementation, a manner for determining the local reconstruction result of the target dendritic tissue in the target image based on the initial reconstruction result corresponding to the target image is: use the initial reconstruction result corresponding to the target image as the local reconstruction result of the target dendritic tissue in the target image.

In another possible implementation, a manner for determining the local reconstruction result of the target dendritic tissue in the target image based on the initial reconstruction result corresponding to the target image is: acquire an incremental reconstruction result of the target dendritic tissue in the target image, and take a combined result of the initial reconstruction result corresponding to the target image and the incremental reconstruction result as the local reconstruction result of the target dendritic tissue in the target image. In an exemplary embodiment, when the initial reconstruction result corresponding to the target image may not provide sufficient data reference for an automatic reconstruction process, the incremental reconstruction result of the target dendritic tissue in the target image is further acquired, and then the combined result of the initial reconstruction result corresponding to the target image and the incremental reconstruction result is used as the local reconstruction result for providing data reference for the automatic reconstruction process. In an exemplary embodiment, the incremental reconstruction result of the target dendritic tissue in the target image is obtained by manually performing additional marking on the basis of the initial reconstruction result corresponding to the target image.

In an exemplary embodiment, the reconstruction reference data corresponding to the target image includes reconstruction reference features of each pixel in the target image, and the reconstruction reference feature of any pixel is used for indicating whether the pixel is a reconstruction reference pixel belonging to the target dendritic tissue determined based on the local reconstruction result.

In a possible implementation, the process of acquiring the reconstruction reference data corresponding to the target image is: determine the reconstruction reference pixels belonging to the target dendritic tissue from the pixels in the target image based on the local reconstruction result; perform binarization processing on the reconstruction reference pixels determined based on the local reconstruction result and other pixels to obtain reconstruction reference features of each pixel in the target image; and use data including the reconstruction reference features of each pixel in the target image as the reconstruction reference data corresponding to the target image.

According to the local reconstruction result, the reconstruction reference pixels may be accurately determined as belonging to the target dendritic tissue, but whether other pixels except the reconstruction reference pixels belong to the target dendritic tissue may not be accurately determined. That is, other pixels may actually belong to the target dendritic tissue or may not belong to the target dendritic tissue. In the reconstruction reference data, other pixels are temporarily defaulted as not belonging to the target dendritic tissue. In the subsequent reconstruction process, the category of other pixels may change.

In an exemplary embodiment, a manner of performing binarization processing on the reconstruction reference pixels determined based on the local reconstruction result and other pixels to obtain the reconstruction reference features of each pixel in the target image is: assign the reconstruction reference pixels determined based on the local reconstruction result with a first numerical value, and assign other pixels with a second numerical value. That is, the reconstruction reference features of the reconstruction reference pixels in the target image are the first numerical value, and the reconstruction reference features of other pixels except the reconstruction reference pixels in the target image are the second numerical value. The first numerical value and the second numerical value are set according to experience, or flexibly adjusted according to an application scenario, which is not limited in the embodiments of this application. Exemplarily, the first numerical value is 1 and the second numerical value is 0.

After the data including the reconstruction reference features of each pixel in the target image is used as the reconstruction reference data corresponding to the target image, the reconstruction reference data corresponding to the target image may intuitively indicate which pixel or pixels in the target image are the reconstruction reference pixels belonging to the target dendritic tissue determined based on the local reconstruction result, which provides data reference for the subsequent reconstruction process of the target dendritic tissue.

In an exemplary embodiment, when the target image is a three-dimensional image, the reconstruction reference data of the target image is three-dimensional data. The three-dimensional reconstruction reference data includes the reconstruction reference features of each pixel.

Illustratively, taking the dendritic tissue being neurons as an example, as shown in FIG. 3, different neurons may be quite approximate. In response to that reconstruction is performed directly based on initial image data, a plurality of neurons that are approximate may be reconstructed into one neuron, resulting in poor reconstruction accuracy of neurons. In the embodiments of this application, by acquiring reconstruction reference data for a neuron, powerful data reference may be provided for accurately reconstructing the neuron in the target image, so that reconstruction may be performed accurately for the neuron in the target image.

Step 202, call a target segmentation model to acquire a target segmentation result corresponding to the target image based on the original image data and the reconstruction reference data, the target segmentation result being used for indicating a target category of each pixel in the target image.

The target category of any pixel is used for indicating that the pixel belongs to the target dendritic tissue or that the pixel does not belong to the target dendritic tissue.

After the original image data corresponding to the target image and the reconstruction reference data corresponding to the target image are acquired, the original image data and the reconstruction reference data are inputted into the target segmentation model for segmentation processing to obtain the target segmentation result corresponding to the target image. The target segmentation result is used for indicating the target category of each pixel in the target image, and the target category of any pixel is used for indicating whether the pixel belongs to the target dendritic tissue. The target category of any pixel here refers to an actual category of the pixel obtained by calling the target segmentation model on the basis of the original image data and reconstruction reference data corresponding to the target image.

For the reconstruction reference pixels indicated by the reconstruction reference data and determined based on the local reconstruction results and belonging to the target dendritic tissue, the target category of the reconstruction reference pixels is used for indicating that the reconstruction reference pixels belong to the target dendritic tissue. For other pixels except the reconstruction reference pixels indicated by the reconstruction reference data and determined based on the local reconstruction results and belonging to the dendritic tissue, the target category of any other pixel may be used for indicating that the other pixel belongs to the target dendritic tissue, and may also be used for indicating that the other pixel does not belong to the target dendritic tissue.

Since the target segmentation result corresponding to the target image can indicate whether each pixel in the target image actually belongs to the target dendritic tissue, the target segmentation result can provide direct data support for automatic reconstruction of the target dendritic tissue.

In an exemplary embodiment, inputs to the target segmentation model are the original image data and the reconstruction reference data. The original image data and the reconstruction reference data may be regarded as two-channel image data. That is, the inputs to the target segmentation model are two-channel image data, one of the two channels is an original image feature channel, and the other channel of the two channels is a reconstruction reference feature channel. The original image data corresponds to the original image feature channel, and the reconstruction reference data corresponds to the reconstruction reference feature channel. By inputting such two-channel image data, more comprehensive initial information can be provided for the target segmentation model, so that the target segmentation model can output more accurate target segmentation results.

Exemplarily, taking the target image being a three-dimensional image as an example, inputs to the target segmentation model are two-channel three-dimensional image data, where all three dimensions are spatial coordinates, one channel of the two channels is a three-dimensional original image feature channel, and the other channel of the two channels is a three-dimensional reconstruction reference feature channel.

The embodiments of this application does not limit a model structure of the target segmentation model, as long as segmentation of each pixel in the target image can be achieved based on the original image data and the reconstruction reference data. Exemplarily, when the target image is a three-dimensional image, the model structure of the target segmentation model is a 3D-UNet structure.

In a possible implementation, the process of calling the target segmentation model to acquire the target segmentation result corresponding to the target image based on the original image data and the reconstruction reference data includes the following steps 2021 to 2023.

Step 2021: Call the target segmentation model to perform a first reference number of times of downsampling processing in sequence based on fusion data of the original image data and the reconstruction reference data to obtain a first target feature corresponding to the target image.

The fusion data of the original image data and the reconstruction reference data refers to data obtained by fusing the original image data and the reconstruction reference data, and the embodiments of this application does not limit a manner for fusing the original image data and the reconstruction reference data. Exemplarily, the target segmentation model includes a data fusion layer, and the process of fusing the original image data and the reconstruction reference data is performed in the data fusion layer in the target segmentation model.

After the fusion data of the original image data and the reconstruction reference data is obtained, the first reference number of times of downsampling processing is performed in sequence based on the fusion data to obtain the first target feature corresponding to the target image. The first target feature corresponding to the target image refers to a deep-level feature obtained by performing downsampling processing on the fusion data of the original image data and the reconstruction reference data.

The first reference number of times is set according to experience, or flexibly adjusted according to an application scenario, which is not limited in the embodiments of this application. For example, the first reference number of times is three times, or the first reference number of times is four times. In an exemplary embodiment, the process of performing the first reference number of times of downsampling processing in sequence based on the fusion data is realized by properly setting a model structure of the target segmentation model.

In an exemplary embodiment, any downsampling processing includes one convolution processing and one pooling processing. Taking the first reference number of times being three times as an example, the process of performing the first reference number of times of downsampling processing in sequence based on the fusion data of the original image data and the reconstruction reference data to obtain the first target feature corresponding to the target image includes the following steps a to c.

Step a: Perform first convolution processing on the fusion data of the original image data and the reconstruction reference data to obtain a first convolution feature corresponding to the target image, and perform first pooling processing on the first convolution feature to obtain a first pooling feature corresponding to the target image.

The implementation of the first convolution processing is not limited in the embodiments of this application. Exemplarily, the implementation of the first convolution processing is: perform feature extraction on the fusion data of the original image data and the reconstruction reference data via two cascaded convolution layers. In an exemplary embodiment, each convolution layer is composed of a convolution function, a batch normalization (BN) function, and a rectified linear unit (ReLU) function. Exemplarily, when the target image is a three-dimensional image, the cascaded convolution layers are 3D convolution layers. The size of a convolution kernel of each convolution layer is not limited in the embodiments of this application. Exemplarily, the size of the convolution kernel of each convolution layer is 3×3×3.

After the first convolution feature is obtained, first pooling processing is performed on the first convolution feature to reduce the size of the first convolution feature. In an exemplary embodiment, the first pooling process is as follows: perform feature extraction on the first convolution feature via a maximum pooling layer. Exemplarily, the kernel size of the maximum pooling layer is 2×2×2.

Step b: perform second convolution processing on the first pooling feature to obtain a second convolution feature corresponding to the target image, and perform second pooling processing on the second convolution feature to obtain a second pooling feature corresponding to the target image.

Step c: perform third convolution processing on the second pooling feature to obtain a third convolution feature corresponding to the target image, and perform third pooling processing on the third convolution feature to obtain the first target feature corresponding to the target image.

The implementation of step b and step c above refers to the implementation of step a, which will not be repeated here. Processing parameters of the first convolution processing, the second convolution processing, and the third convolution processing may be the same or different, which is not limited in the embodiments of this application. In an exemplary embodiment, the processing parameters of the first convolution processing, the second convolution processing, and the third convolution processing are different, such that feature dimensions corresponding to the features extracted after different convolution processing are different. In an exemplary embodiment, the processing parameters of the first pooling processing, the second pooling processing, and the third pooling processing are the same, and are all used for reducing sizes of the features by the same proportion.

Step 2022: Perform the first reference number of times of upsampling processing in sequence based on a target convolution feature corresponding to the first target feature to obtain a second target feature corresponding to the target image.

The target convolution feature corresponding to the first target feature refers to a feature obtained by performing convolution processing on the first target feature. The process of performing convolution processing on the first target feature is determined by the model structure of the target segmentation model, which is not limited in the embodiments of this application. In an exemplary embodiment, the process of performing convolution processing on the first target feature is: perform feature extraction on the first target feature via two cascaded convolution layers.

After the target convolution feature corresponding to the first target feature is obtained, the first reference number of times of upsampling processing is performed in sequence to obtain the second target feature corresponding to the target image. The number of times of upsampling processing performed based on the target convolution feature here is the same as the number of times of downsampling processing performed in sequence based on the fusion data of the original image data and the reconstruction reference data in step 2021. In some embodiments, the number of times of upsampling processing performed based on the target convolution feature may also be different from the number of times of downsampling processing performed in sequence based on the fusion data of the original image data and the reconstruction reference data in step 2021.

In an exemplary embodiment, any upsampling processing includes one deconvolution processing and one convolution processing. When the first reference number of times is three times, the process of performing the first reference number of times of upsampling processing in sequence based on the target convolution feature corresponding to the first target feature to obtain the second target feature corresponding to the target image includes the following steps A to C.

Step A: Perform first deconvolution processing on the target convolution feature corresponding to the first target feature to obtain a first upsampling feature corresponding to the target image, and perform fourth convolution processing on a spliced feature of the first upsampling feature and the third convolution feature to obtain a fourth convolution feature corresponding to the target image.

By performing the first deconvolution processing on the target convolution feature, the size of the target convolution feature may be increased, and a feature dimension may be reduced. The implementation of the first deconvolution processing is not limited in the embodiments of this application. Exemplarily, the implementation of the first deconvolution processing is: perform deconvolution on the target convolution feature via a deconvolution layer.

After the first deconvolution processing is performed on the target convolution feature, the first upsampling feature is obtained. The first upsampling feature and the third convolution feature obtained in step c in step 2021 have the same size and feature dimension. Therefore, the first upsampling feature and the third convolution feature may be spliced to obtain the spliced feature of the first upsampling feature and the third convolution feature. In an exemplary embodiment, the spliced feature of the first upsampling feature and the third convolution feature is a feature obtained by splicing the first upsampling feature and the third convolution feature in the feature dimension.

After the spliced feature of the first upsampling feature and the third convolution feature is obtained, the fourth convolution processing is performed on the spliced feature of the first upsampling feature and the third convolution feature to obtain the fourth convolution feature corresponding to the target image. In an exemplary embodiment, a manner of the fourth convolution processing is: perform feature extraction on the spliced feature of the first upsampling feature and the third convolution feature via two cascaded convolution layers.

Step B: Perform second deconvolution processing on the fourth convolution feature to obtain a second upsampling feature corresponding to the target image, and perform fifth convolution processing on a spliced feature of the second upsampling feature and the second convolution feature to obtain a fifth convolution feature corresponding to the target image.

Step C: Perform third deconvolution processing on the fifth convolution feature to obtain a third upsampling feature corresponding to the target image, and perform sixth convolution processing on a spliced feature of the third upsampling feature and the first convolution feature to obtain the second target feature corresponding to the target image.

The implementation of step B and step C above refers to the implementation of step A, which will not be repeated here. In an exemplary embodiment, processing parameters of the first deconvolution processing, the second deconvolution processing, and the third deconvolution processing are different, such that feature dimensions of the features obtained after different deconvolution processing are different. In an exemplary embodiment, processing parameters of the fourth convolution processing, the fifth convolution processing, and the sixth convolution processing are different, such that feature dimensions of the features obtained after different convolution processing are different.

Step 2023: Perform target convolution processing on the second target feature to obtain the target segmentation result corresponding to the target image.

After the second target feature corresponding to the target image is obtained, the target convolution processing is performed on the second target feature to obtain the target segmentation result corresponding to the target image. The process of performing the target convolution processing on the second target feature is determined by the model structure of the target segmentation model, which is not limited in the embodiments of this application. In an exemplary embodiment, a manner for performing the target convolution processing on the second target feature is different from manners for performing convolution processing on other features, and the objective of performing the target convolution processing on the second target feature is to obtain the target segmentation result which may indicate the target category of each pixel in the target image.

Figure 4:
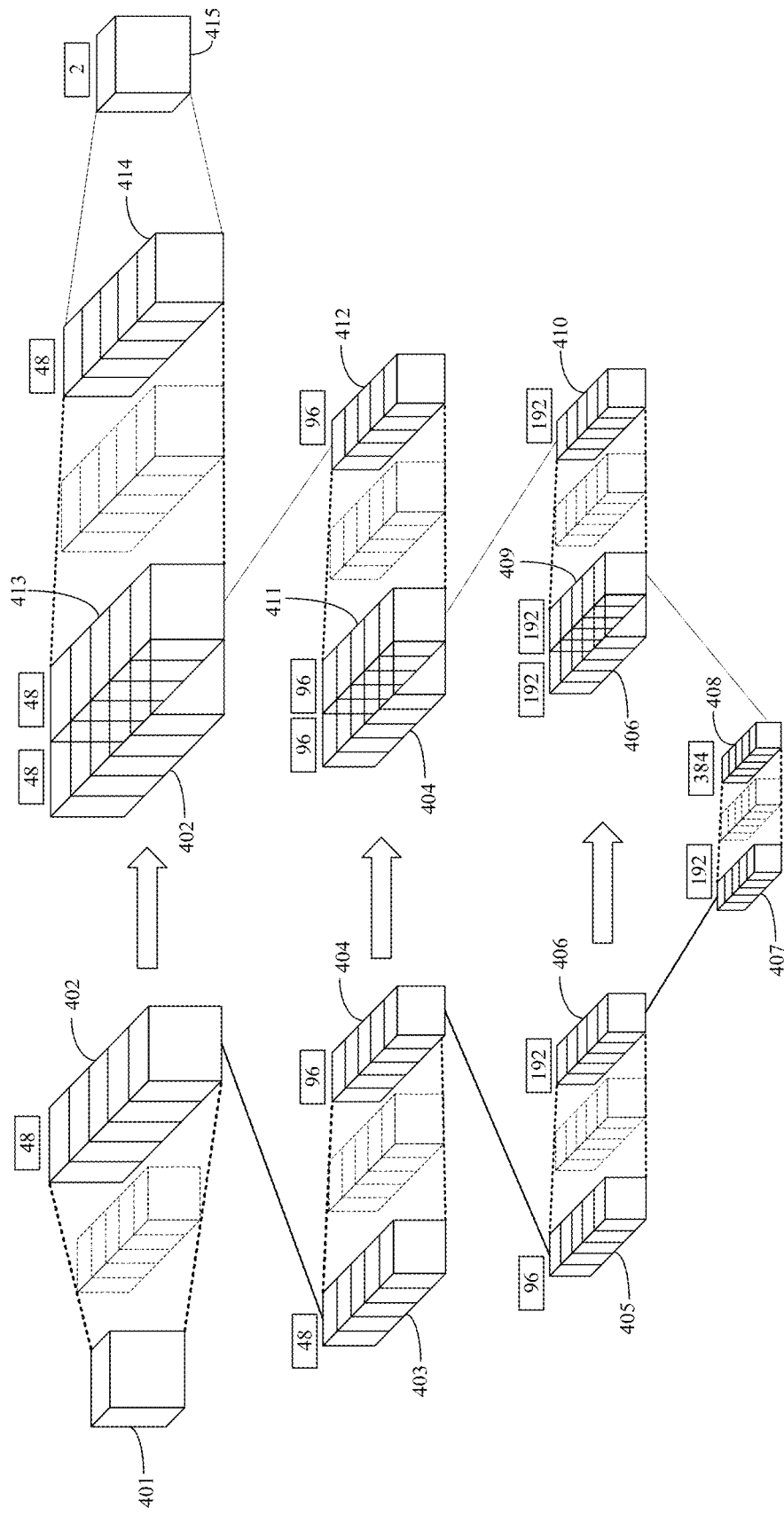
FIG. 4 is a schematic diagram of a process of acquiring a target segmentation result corresponding to a target image provided by an embodiment of this application.

Exemplarily, the process of calling the target segmentation model to acquire the target segmentation result corresponding to the target image based on the original image data and the reconstruction reference data is as shown in FIG. 4. After the original image data and the reconstruction reference data are inputted into the target segmentation model, the first convolution processing is performed on fusion data 401 of the original image data and the reconstruction reference data to obtain a first convolution feature 402 corresponding to the target image, and the first pooling processing is performed on the first convolution feature 402 to obtain a first pooling feature 403 corresponding to the target image. The second convolution processing is performed on the first pooling feature 403 to obtain a second convolution feature 404 corresponding to the target image, and the second pooling processing is performed on the second convolution feature 404 to obtain a second pooling feature 405 corresponding to the target image. The third convolution processing is performed on the second pooling feature 405 to obtain a third convolution feature 406 corresponding to the target image, and the third pooling processing is performed on the third convolution feature 406 to obtain a first target feature 407 corresponding to the target image.

After the first target feature 407 is obtained, a target convolution feature 408 corresponding to the first target feature is obtained by performing convolution processing on the first target feature 407. The first deconvolution processing is performed on the target convolution feature 408 to obtain a first upsampling feature 409 corresponding to the target image. The fourth convolution processing is performed on a spliced feature of the first upsampling feature 409 and the third convolution feature 406 to obtain a fourth convolution feature 410 corresponding to the target image. The second deconvolution processing is performed on the fourth convolution feature 410 to obtain a second upsampling feature 411 corresponding to the target image, and the fifth convolution processing is performed on a spliced feature of the second upsampling feature 411 and the second convolution feature 404 to obtain a fifth convolution feature 412 corresponding to the target image. The third deconvolution processing is performed on the fifth convolution feature 412 to obtain a third upsampling feature 413 corresponding to the target image, and the sixth convolution processing is performed on a spliced feature of the third upsampling feature 413 and the first convolution feature 402 to obtain a second target feature 414 corresponding to the target image. After the second target feature 414 is obtained, the target convolution processing is performed on the second target feature 414 to obtain a target segmentation result 415 corresponding to the target image.

The numbers marked on each feature in FIG. 4 represent the feature dimension of each feature. For example, the number 48 marked on the first convolution feature 402 indicates that the feature dimension of the first convolution feature 402 is 48; and the number 96 marked on the second convolution feature 404 indicates that the feature dimension of the second convolution feature 404 is 96. The number 2 marked on the target segmentation result 415 indicates that the dimension of the target segmentation result is 2, that is, the target segmentation result includes a probability value that the pixels in the target image belong to the target dendritic tissue and a probability value that the pixels in the target image do not belong to the target dendritic tissue correspondingly.

In a possible implementation, after the target segmentation result corresponding to the target image is obtained, the method further includes the following step: call a target classification model to acquire target reconstruction confidence information based on the original image data and the target segmentation result. The target reconstruction confidence information is used for indicating the reliability of the complete reconstruction result obtained based on the target segmentation result.

Exemplarily, the target reconstruction confidence information includes a probability value that the target segmentation result is a correct segmentation result and a probability value that the target segmentation result is an incorrect segmentation result. The sum of the probability value that the target segmentation result is a correct segmentation result and the probability value that the target segmentation result is an incorrect segmentation result is 1. In response to that the probability value that the target segmentation result is a correct segmentation result is not less than the probability value that the target segmentation result is an incorrect segmentation result, the reliability of the complete reconstruction result obtained based on the target segmentation result is relatively high. In response to that the probability value that the target segmentation result is a correct segmentation result is less than the probability value that the target segmentation result is an incorrect segmentation result, the reliability of the complete reconstruction result determined based on the target segmentation result is relatively low. In this case, the complete reconstruction result, determined based on the target segmentation result, of the target dendritic tissue in the target image may be incorrect and needs to be corrected manually.

A model structure of the target classification model is not limited in the embodiments of this application, as long as the target reconstruction confidence information can be determined according to the original image data and the target segmentation result. Exemplarily, the model structure of the target classification model is a convolutional neural network (CNN) structure. In an exemplary embodiment, when the target image is a three-dimensional image, the model structure of the target classification model is a three-dimensional convolutional neural network (3D-CNN) structure. Exemplarily, when the model structure of the target classification model is the 3D-CNN structure, the target classification model is a 3D visual geometry group 11 (3D-VGG11) model. The model structure of the target classification model is not limited thereto.

Figure 5:
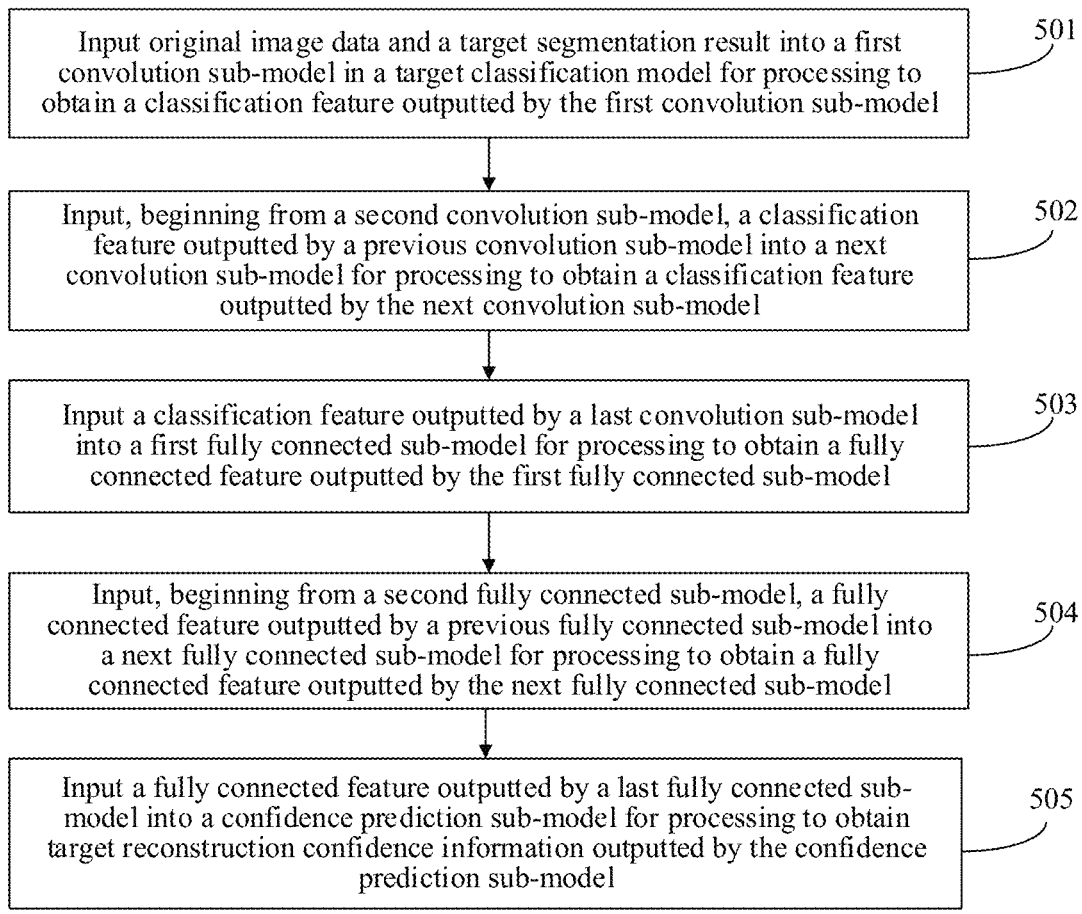
FIG. 5 is a flowchart of a process of acquiring target reconstruction confidence information provided by an embodiment of this application.

In a possible implementation, the target classification model includes at least one convolution sub-model, at least one fully connected sub-model and a confidence prediction sub-model connected in sequence. In this case, referring to FIG. 5, the process of calling the target classification model to acquire the target reconstruction confidence information based on the original image data and the target segmentation result includes the following steps 501 to 505.

Step 501: Input the original image data and the target segmentation result into a first convolution sub-model in the target classification model for processing to obtain a classification feature outputted by the first convolution sub-model.

In an exemplary embodiment, the first convolution sub-model includes at least one convolution layer and a pooling layer connected in sequence, and the process of inputting the original image data and the target segmentation result into the first convolution sub-model in the target classification model for processing is: process fusion data of the original image data and the target segmentation result based on the at least one convolution layer and the pooling layer connected in sequence. The number of convolution layers included in the first convolution sub-model, the size of the convolution kernel of each convolution layer, the type of the pooling layer, and the kernel size of the pooling layer are not limited in the embodiments of this application. For example, the number of the convolution layers included in the first convolution sub-model is 1, the convolution kernel of each convolution layer is 3×3×3, the type of the pooling layer is a maximum pooling layer, and the kernel size of the pooling layer is 2×2×2.

Step 502: Input, beginning from a second convolution sub-model, a classification feature outputted by a previous convolution sub-model into a next convolution sub-model for processing to obtain a classification feature outputted by the next convolution sub-model.

After the classification feature outputted by the first convolution sub-model are obtained, the classification feature outputted by the first convolution sub-model is inputted into the second convolution sub-model for processing to obtain a classification feature outputted by the second convolution sub-model, and the operation is repeated until a classification feature outputted by a last convolution sub-model is obtained.

The number of the convolution sub-models included in the target classification model is not limited in the embodiments of this application. For the case where the target classification model includes a plurality of convolution sub-models, the numbers of convolution layers included in different convolution sub-models may be the same or different, which is not limited in the embodiments of this application. Setting manners of processing parameters of the convolution layers and the pooling layers are not limited in the embodiments of this application, and different processing parameters can obtain features of different dimensions.

Step 503: Input the classification feature outputted by the last convolution sub-model into a first fully connected sub-model for processing to obtain a fully connected feature outputted by the first fully connected sub-model.

After the classification feature outputted by the last convolution sub-model is obtained, the classification feature outputted by the last convolution sub-model is used as an input of the first fully connected sub-model, and then is processed by the first fully connected sub-model to obtain the fully connected feature outputted by the first fully connected sub-model.

Exemplarily, the first fully connected sub-model includes a fully connected layer, and the classification feature outputted by the last convolution sub-model is processed via the fully connected layer. A setting manner of processing parameters of the fully connected layer included in the first fully connected sub-model is not limited in the embodiments of this application, and can be set according to experience.

Step 504: Input, beginning from a second fully connected sub-model, a fully connected feature outputted by a previous fully connected sub-model into a next fully connected sub-model for processing to obtain a fully connected feature outputted by the next fully connected sub-model.

After the fully connected feature outputted by the first fully connected sub-model is obtained, the fully connected feature outputted by the first fully connected sub-model is inputted into the second fully connected sub-model for processing to obtain a fully connected feature outputted by the second fully connected sub-model, and the operation is repeated until a fully connected feature outputted by a last fully connected sub-model is obtained.

The number of the fully connected sub-models included in the target classification model is not limited in the embodiments of this application. For the case where the target classification model includes a plurality of fully connected sub-models, processing parameters of fully connected layers in different fully connected sub-models may be the same or different, which is not limited in the embodiments of this application.

Step 505: Input the fully connected feature outputted by the last fully connected sub-model into the confidence prediction sub-model for processing to obtain the target reconstruction confidence information outputted by the confidence prediction sub-model.

After the fully connected feature outputted by the last fully connected sub-model is obtained, the fully connected feature outputted by the last fully connected sub-model is used as an input of the confidence prediction sub-model, and then is processed by the confidence prediction sub-model to obtain the target reconstruction confidence information outputted by the confidence prediction sub-model. The structure of the confidence prediction sub-model is not limited in the embodiments of this application, as long as the reconstruction confidence information can be outputted. Exemplarily, the confidence prediction sub-model includes a fully connected layer, and the target reconstruction confidence information is outputted through processing of the fully connected layer.

In an exemplary embodiment, an activation function used in the target classification model is a ReLU function.

Figure 6:
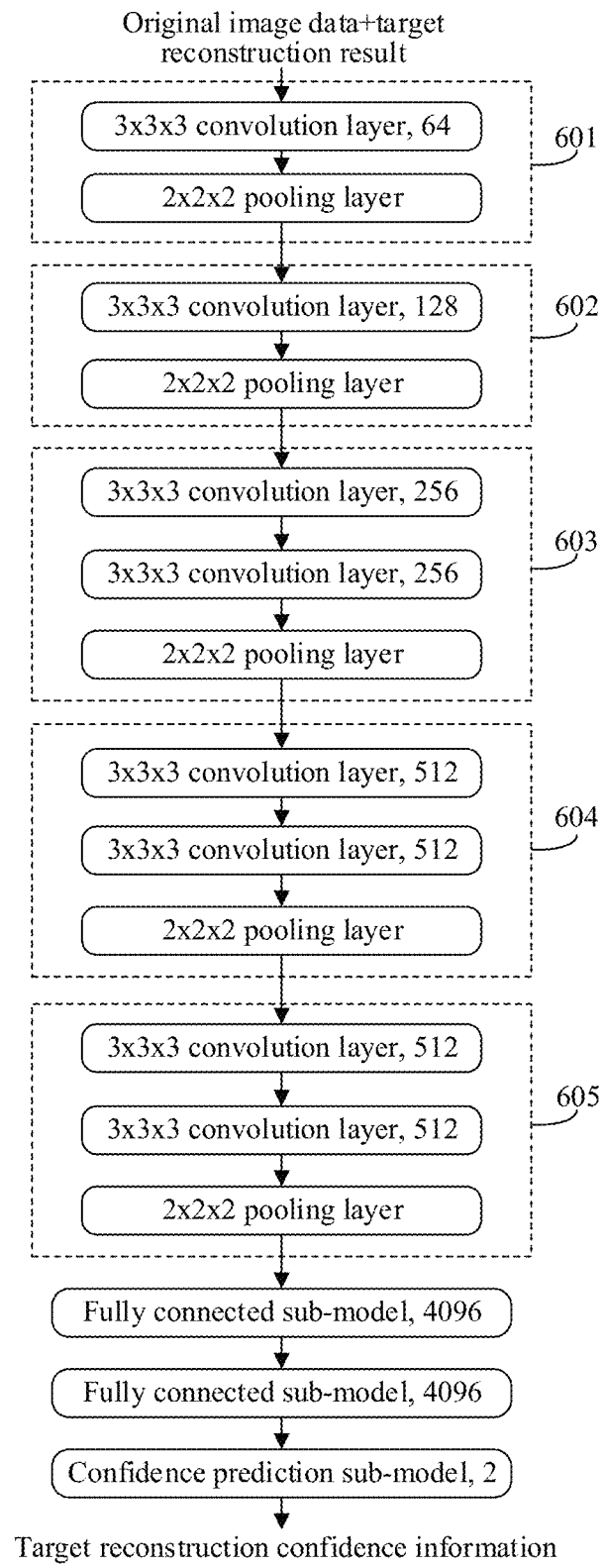
FIG. 6 is a schematic structural diagram of a target classification model provided by an embodiment of this application.

In an exemplary embodiment, taking the target image being a three-dimensional image as an example, as shown in FIG. 6, the target classification model includes five convolution sub-models, two fully connected sub-models and a confidence prediction sub-model connected in sequence. The numbers of convolution layers included in the five convolution sub-models are 1, 1, 2, 2, and 2 respectively, and each convolution sub-model includes a pooling layer. Exemplarily, the size of convolution kernels of all the convolution layers is 3×3×3, the kernel size of all the pooling layers is 2×2×2, and the pooling layers are maximum pooling layers or average pooling layers, which is not limited in the embodiments of this application. That is, a first convolution sub-model 601 includes a convolution layer and a pooling layer; a second convolution sub-model 602 includes a convolution layer and a pooling layer; a third convolution sub-model 603 includes two convolution layers and a pooling layer; a fourth convolution sub-model 604 includes two convolution layers and a pooling layer; and a fifth convolution sub-model 605 includes two convolution layers and a pooling layer.

An input of the target classification model is two-channel three-dimensional image data (that is, the original image data and a target reconstruction result). Assuming that the size of the target image is 32×32×32, the size of the two-channel three-dimensional image data inputted to the target classification model is 32×32×32×2, and an output of the target classification model is the target reconstruction confidence information used for indicating the reliability of the complete reconstruction result obtained based on the target segmentation result.

After the two-channel three-dimensional image data passes through the convolution layer in the first convolution sub-model 601, 64-dimensional features may be extracted from each pixel, and the size in each direction may be reduced to ½ of the original size via the pooling layer. That is, after the processing of the first convolution sub-model, the size of the outputted classification feature is 16×16×16× 64. Then, feature dimensions of the classification features outputted by each convolution sub-model are 128, 256, 512, and 512 respectively. Finally, after processing of two fully connected sub-models with output feature dimensions of 4096 and 4096 and the confidence prediction sub-model with an output feature dimension of 2, the target reconstruction confidence information is obtained.

In an exemplary embodiment, for the case where the target classification model does not need to be called to obtain the target reconstruction confidence information after the target segmentation result is obtained, the target segmentation model needs to be obtained by training at first before being called to obtain the target segmentation result. In a possible implementation, in this case, the process of obtaining the target segmentation model by training includes the following steps 1-1 and 1-2.

Step 1-1: Obtain at least one sample image, original sample image data respectively corresponding to the at least one sample image, reconstruction reference sample data respectively corresponding to the at least one sample image, and standard segmentation results respectively corresponding to the at least one sample image.

The sample image refers to an image used for training the segmentation model. One sample image corresponds to one sample dendritic tissue. Different sample images may correspond to the same sample dendritic tissue or different sample dendritic tissues, which is not limited in the embodiments of this application. A real complete reconstruction result of the sample dendritic tissue corresponding to any sample image in the sample image is known, and is used as a standard complete reconstruction result of the sample dendritic tissue corresponding to the sample image in any sample image.

A manner for acquiring the sample image is not limited in the embodiments of this application, as long as the standard complete reconstruction result of the sample dendritic tissue corresponding to the sample image in the sample image is ensured to be known.

In an exemplary embodiment, the sample image is a local image in the whole image, and the size of the sample image is 32×32×32. After the sample image is determined, the original sample image data corresponding to the sample image may be directly acquired.

The reconstruction reference sample data corresponding to any sample image is used for providing data reference for calling the segmentation model to obtain a predicted segmentation result of the sample image. Exemplarily, the reconstruction reference sample data corresponding to any sample image is determined based on a local reconstruction result of the standard complete reconstruction result of the sample dendritic tissue corresponding to the sample image in the sample image.

The local reconstruction result of the standard complete reconstruction result of the sample dendritic tissue corresponding to any sample image in the sample image is retained, and the reconstruction reference sample data corresponding to the sample image is determined based on the retained local reconstruction result. The standard complete reconstruction result may indicate all pixels belonging to the sample dendritic tissue corresponding to any sample image, and the retained local reconstruction result may indicate part of the pixels belonging to the sample dendritic tissue corresponding to any sample image. The retained part of the pixels belonging to the sample dendritic tissue corresponding to any sample image may provide data reference for calling the segmentation model to realize the reconstruction process in the sample dendritic tissue.

The relationship between the retained local reconstruction result and the standard complete reconstruction result is not limited in the embodiments of this application. Exemplarily, the part of pixels belonging to the sample dendritic tissue corresponding to any sample image indicated by the retained local reconstruction result are first reference number of pixels among all the pixels belonging to the sample dendritic tissue corresponding to the sample image indicated by the standard complete reconstruction result. Exemplarily, the first reference number of pixels among all the pixels belonging to the sample dendritic tissue corresponding to any sample image refer to first reference number of pixels closest to a starting pixel of the sample image among all the pixels belonging to the sample dendritic tissue corresponding to the sample image. The reference number is set according to experience, or flexibly adjusted according to the number of all the pixels belonging to the sample dendritic tissue corresponding to any sample image, which is not limited in the embodiments of this application. Exemplarily, the reference number is half of the number of all the pixels belonging to the sample dendritic tissue corresponding to any sample image.

A manner of determining the reconstruction reference sample data corresponding to any sample image based on the local reconstruction result of the standard complete reconstruction result of the sample dendritic tissue corresponding to the sample image in the sample image refers to the manner of acquiring the reconstruction reference data corresponding to the target image in step 201, which will not be repeated here.

The standard segmentation result corresponding to any sample image is used for indicating a standard category corresponding to each pixel in the sample image, and the standard category corresponding to any pixel is used for indicating whether the pixel actually belongs to the sample dendritic tissue corresponding to the sample image. The standard segmentation result corresponding to any sample image may be directly determined based on the standard complete reconstruction result of the sample dendritic tissue corresponding to the sample image in the sample image.

Step 1-2: Perform supervised training on an initial segmentation model based on the original sample image data respectively corresponding to the at least one sample image, the reconstruction reference sample data respectively corresponding to the at least one sample image, and the standard segmentation results respectively corresponding to the at least one sample image to obtain the target segmentation model.

The initial segmentation model refers to a segmentation model that needs to be trained, and the target segmentation model refers to a trained segmentation model. In a possible implementation, the process of performing supervised training on the initial segmentation model based on the original sample image data respectively corresponding to the at least one sample image, the reconstruction reference sample data respectively corresponding to the at least one sample image, and the standard segmentation results respectively corresponding to the at least one sample image to obtain the target segmentation model is: 1. call an initial classification model to acquire a predicted segmentation result corresponding to the target sample image based on original sample image data and reconstruction reference sample data corresponding to a target sample image in the at least one sample image, the target sample image being a sample image used for updating parameters of a classification model once in the at least one sample image; 2. determine a target loss function based on the predicted segmentation result corresponding to the target sample image and a standard segmentation result corresponding to the target sample image, and update the parameters of the initial classification model reversely based on the target loss function to obtain the classification model with the updated parameters; and 3. in response to that a parameter updating termination condition is not met, perform step 1 and step 2 based on the classification model with the updated parameters until the parameter updating termination condition is met, so as to obtain the target classification model.

The target sample image used in the process of performing step 1 and step 2 based on the classification model with the updated parameters can be the same as or different from the target sample image used in the process of performing step 1 and step 2 based on the initial classification model, which is not limited in the embodiments of this application. There may be one or more target sample images used in each execution of step 1 and step 2, which is not limited in the embodiments of this application. In an exemplary embodiment, the same number of target sample images are used in each execution of step 1 and step 2.

In a possible implementation, meeting the parameter updating termination condition includes, but is not limited to, any of the following: the target loss function converges, the target loss function is smaller than a reference loss threshold, and the number of parameter updates reaches a threshold number of times. In an exemplary embodiment, in the process of training the classification model, the model parameters are updated each time by using a small batch of sample images in each sample image, and when all the sample images participate in the updating of the model parameters once, a complete training (that is, an epoch) is completed. In this case, meeting the parameter updating termination condition further includes: the number of complete training reaches a specified threshold. For example, the specified threshold is 50.

In an exemplary embodiment, the process of determining the target loss function based on the predicted segmentation result corresponding to the target sample image and the standard segmentation result corresponding to the target sample image is implemented based on Formula 1.

$$L_1 = \|G(z,I) - y\|_2 \qquad \text{(Formula 1)}$$

$L_1$ represents the target loss function; z represents the reconstruction reference sample data corresponding to the target sample image; I represents the original sample image data corresponding to the target sample image; $G(z, I)$ represents the predicted segmentation result corresponding to the target sample image; and y represents the standard segmentation result corresponding to the target sample image.

A manner for determining the target loss function may also be implemented in other manners, which is not limited in the embodiments of this application.

In an exemplary embodiment, for the case where the target classification model is called to acquire the target reconstruction confidence information after the target segmentation result is acquired, in addition to acquiring the trained target segmentation model, the trained target classification model also needs to be acquired. The target segmentation model and the target classification model may be obtained by uniform adversarial training, or may be obtained by separate training, which is not limited in the embodiments of this application.

In a possible implementation, for the case where the target segmentation model and the target classification model are obtained by uniform adversarial training, the process of obtaining the target segmentation model and the target classification model by training includes the following steps 2-1 and 2-2.

Step 2-1: Obtain at least one sample image, original sample image data respectively corresponding to the at least one sample image, reconstruction reference sample data respectively corresponding to the at least one sample image, and standard segmentation results respectively corresponding to the at least one sample image.

The implementation of step 2-1 refers to step 1-1 above, which will not be repeated here.

Step 2-2: Perform adversarial training on the initial segmentation model and the initial classification model based on the original sample image data respectively corresponding to the at least one sample image, the reconstruction reference sample data respectively corresponding to the at least one sample image, and the standard segmentation results respectively corresponding to the at least one sample image to obtain the target segmentation model and the target classification model.

The initial segmentation model refers to a segmentation model that needs to be trained, and the initial classification model refers to a classification model that needs to be trained. The target segmentation model refers to a trained segmentation model, and the target classification model refers to a trained classification model. In a possible implementation, the implementation process of step 2-2 includes the following steps 2-2a to 2-2g.

2-2a: Call the initial segmentation model to acquire a predicted segmentation result corresponding to a first sample image in the at least one sample image based on original sample image data corresponding to the first sample image and reconstruction reference sample data corresponding to the first sample image.

The first sample image refers to a sample image used for updating the parameters of the classification model once in one adversarial training in the at least one sample image. There may be one or more first sample images, which is not limited in the embodiments of this application. The implementation process of step 2-2a refers to the process of calling the target segmentation model to acquire the target segmentation result corresponding to the target image in step 202, which will not be repeated here.

2-2b: Call the initial classification model to acquire first reconstruction confidence information based on the original sample image data corresponding to the first sample image and the predicted segmentation result corresponding to the first sample image, and to acquire second reconstruction confidence information based on the original sample image data corresponding to the first sample image and a standard segmentation result corresponding to the first sample image.

The first reconstruction confidence information is predicted by the initial classification model based on the original sample image data corresponding to the first sample image and the predicted segmentation result corresponding to the first sample image, and used for indicating the reliability of a reconstruction result obtained according to the predicted segmentation result corresponding to the first sample image. The second reconstruction confidence information is predicted by the initial classification model based on the original sample image data corresponding to the first sample image and the standard segmentation result corresponding to the first sample image, and used for indicating the reliability of a reconstruction result obtained according to the standard segmentation result corresponding to the first sample image.

Exemplarily, the first reconstruction confidence information includes a probability value that the predicted segmentation result corresponding to the first sample image is a correct segmentation result and a probability value that the predicted segmentation result corresponding to the first sample image is an incorrect segmentation result, and the second reconstruction confidence information includes a probability value that the standard segmentation result corresponding to the first sample image is a correct segmentation result and a probability value that the standard segmentation result corresponding to the first sample image is an incorrect segmentation result.

The implementation process of step 2-2b refers to the process of calling the target classification model to acquire the target confidence information in step 202, which will not be repeated here.

2-2c: Determine a first loss function based on the first reconstruction confidence information and the second reconstruction confidence information, update parameters of the initial classification model based on the first loss function, and obtain a first classification model in response to that an updating process of the parameters of the initial classification model meets a first termination condition.

Exemplarily, the process of determining the first loss function based on the first reconstruction confidence information and the second reconstruction confidence information is implemented based on Formula 2.

$$L_2 = E_y[\log D(y,I)] + E_z[\log(1-(z,I))]$$ (Formula 2)

$L_2$ represents the first loss function; $z$ represents the reconstruction reference sample data corresponding to the first sample image; $I$ represents the original sample image data corresponding to the first sample image; $G(z, I)$ represents the predicted segmentation result corresponding to the first sample image; $D(G(z, I))$ represents the probability value that the predicted segmentation result corresponding to the first sample image is the correct segmentation result included in the first reconstruction confidence information; $y$ represents the standard segmentation result corresponding to the first sample image; and $D(y, I)$ represents the probability value that the standard segmentation result corresponding to the first sample image is the correct segmentation result included in the second reconstruction confidence information.

In the process of updating the parameters of the initial classification model based on the first loss function, an updating target is to maximize the first loss function, that is, the updating target is to make the classification model predict the probability value that the standard segmentation result corresponding to the first sample image is the correct segmentation result to be 1 as much as possible, and the probability value that the predicted segmentation result corresponding to the first sample image is the correct segmentation result to be 0 as much as possible.

In the process of updating the parameters of the initial classification model based on the first loss function, parameters of the initial segmentation model remain unchanged.

After updating the parameters of the initial classification model once based on the first loss function, whether the updating process of the parameters of the initial classification model meets the first termination condition is determined. When the updating process of the parameters of the initial classification model meets the first termination condition, the first classification model is obtained, and step 2-2d is then executed. When the updating process of the parameters of the initial classification model does not meet the first termination condition, the parameters of the initial classification model continue to be updated again based on step 2-2a to step 2-2c above, until the updating process of the parameters of the initial classification model meets the first termination condition, and step 2-2d is then executed.

In an exemplary embodiment, that the updating process of the parameters of the initial classification model meets the first termination condition means that the number of updates of the parameters of the initial classification model reaches a first threshold. The first threshold is set according to experience or flexibly adjusted according to an application scenario, which is not limited in the embodiments of this application.

When the updating process of the parameters of the initial classification model meets the first termination condition, training on the classification model in one adversarial training is completed. A complete adversarial training includes not only the training on the classification model, but also the training on a segmentation model. The training on the segmentation model in the complete adversarial training is implemented based on the following steps 2-2d to 2-2f.

2-2d: Call the initial segmentation model to acquire a predicted segmentation result corresponding to a second sample image in the at least one sample image based on original sample image data corresponding to the second sample image and reconstruction reference sample data corresponding to the second sample image.

The second sample image refers to a sample image used for updating the parameters of the segmentation model once in one adversarial training in the at least one sample image. The second sample image may be the same as or different from the first sample image, which is not limited in the embodiments of this application. In addition, there may be one or more second sample images. The implementation process of step 2-2d refers to the process of calling the target segmentation model to acquire the target segmentation result corresponding to the target image in step 202, which will not be repeated here.

2-2e: Call the first classification model to acquire third reconstruction confidence information based on the original sample image data corresponding to the second sample image and the predicted segmentation result corresponding to the second sample image.

The third reconstruction confidence information is predicted by the first classification model based on the original sample image data corresponding to the second sample image and the predicted segmentation result corresponding to the second sample image, and used for indicating the reliability of a reconstruction result obtained according to the predicted segmentation result corresponding to the second sample image. Exemplarily, the third reconstruction confidence information includes a probability value that the predicted segmentation result corresponding to the second sample image is a correct segmentation result and a probability value that the predicted segmentation result corresponding to the second sample image is an incorrect segmentation result. The implementation process of step 2-2e refers to the process of calling the target classification model to acquire the target confidence information in step 202, which will not be repeated here.

2-2f: Determine a second loss function based on the third reconstruction confidence information, the predicted segmentation result corresponding to the second sample image, and a standard segmentation result corresponding to the second sample image, update the parameters of the initial segmentation model based on the second loss function, and obtain a first segmentation model in response to that an updating process of the parameters of the initial segmentation model meets a second termination condition.

Exemplarily, the process of determining the second loss function based on the third reconstruction confidence information, the predicted segmentation result corresponding to the second sample image, and the standard segmentation result corresponding to the second sample image is implemented based on Formula 3.

$$L_3 = E_z[\log(1 - D(G(z,I)))] + \|G(z,I) - y\|_2 \quad \text{(Formula 3)}$$

$L_3$ represents the second loss function; z represents the reconstruction reference sample data corresponding to the second sample image; I represents the original sample image data corresponding to the second sample image; G(z, I) represents the predicted segmentation result corresponding to the second sample image; y represents the standard segmentation result corresponding to the second sample image; and D(G(z, I)) represents the probability value that the predicted segmentation result corresponding to the second sample image is the correct segmentation result included in the third reconstruction confidence information.

In the process of updating the parameters of the initial segmentation model based on the second loss function, an updating target is to minimize the second loss function, that is, the updating target is to make the classification model predict the probability value that the predicted segmentation result corresponding to the second sample image is the correct segmentation result to be 1 as much as possible, and the predicted segmentation result predicted by the segmentation model approach the standard segmentation result as much as possible.

Based on the second loss function determined by Formula 3, the segmentation model is trained not only through feedback of the classification model, but also through constraints of the standard reconstruction result, which is beneficial to improving the training accuracy of the segmentation model.

In the process of updating the parameters of the initial segmentation model based on the second loss function, parameters of the first classification model remain unchanged.

After the parameters of the initial segmentation model are updated once based on the second loss function, whether the updating process of the parameters of the initial segmentation model meets the second termination condition is determined. When the updating process of the parameters of the initial segmentation model meets the second termination condition, the first segmentation model is obtained, and step 2-2g is then executed. When the updating process of the parameters of the initial segmentation model does not meet the second termination condition, the parameters of the initial segmentation model continue to be updated again based on step 2-2d to step 2-2f above, until the updating process of the parameters of the initial segmentation model meets the second termination condition, and step 2-2g is then executed.

In an exemplary embodiment, that the updating process of the parameters of the initial segmentation model meets the second termination condition means that the number of updates of the parameters of the initial segmentation model reaches a second threshold. The second threshold is set according to experience or flexibly adjusted according to an application scenario, which is not limited in the embodiments of this application. The second threshold is the same as or different from the first threshold, which is not limited in the embodiments of this application.

When the updating process of the parameters of the initial segmentation model meets the second termination condition, training on the segmentation model in one complete adversarial training is completed. After one complete adversarial training is completed, the first classification model and the first segmentation model are obtained.

2-2g: In response to that an adversarial training process does not meet a target termination condition, continue to perform adversarial training on the first classification model and the first segmentation model until the adversarial training process meets the target termination condition, so as to obtain the target classification model and the target segmentation model.

After the first classification model and the first segmentation model are obtained, that is, after one complete adversarial training is completed, whether the adversarial training process meets the target termination condition is determined. When the adversarial training process meets the target termination condition, the first segmentation model is directly used as the target segmentation model, and the first classification model is directly used as the target classification model.

When the adversarial training process does not meet the target termination condition, adversarial training continues to be performed on the first classification model and the first segmentation model based on steps 2-2a to 2-2f until the adversarial training process meets the target termination condition. A segmentation model obtained when the target termination condition is met is used as the target segmentation model, and a classification model obtained when the target termination condition is met is used as the target classification model.

In an exemplary embodiment, that the adversarial training process meets the target termination condition includes, but is not limited to, any of the following: the number of adversarial training reaches a third threshold; a specified loss function converges; and the specified loss function is not greater than a specified loss threshold. The specified loss function refers to the second loss function when one complete adversarial training is completed.

Exemplarily, in the process of obtaining the target classification model and the target segmentation model based on adversarial training, the segmentation model and the classification model constitute a generative adversary network (GAN) framework. The input of the segmentation model is the original sample image data and the reconstruction reference sample data, and the output of the segmentation model is the predicted segmentation result corresponding to the sample image. The input of the classification model is the original sample image data, the standard segmentation results and the predicted segmentation result outputted by the segmentation model, and the output of the classification model is the reconstruction confidence information. The closer the probability value that the predicted segmentation result is the correct segmentation result included in the reconstruction confidence information determined based on the predicted segmentation result is to 0, the lower the classification model considers the reliability of the reconstruction result obtained based on the segmentation result predicted by the segmentation model. The closer the probability value that the predicted segmentation result is the correct segmentation result included in the reconstruction confidence information determined based on the predicted segmentation result is to 1, the higher the classification model considers the reliability of the reconstruction result obtained based on the segmentation result predicted by the segmentation model. Through the GAN framework, the segmentation accuracy of the segmentation model may be improved, and more accurate reconstruction confidence information may also be provided, which can help researchers to quickly locate regions that may be reconstructed incorrectly.

Exemplarily, by using D to represent the classification model, G to represent the segmentation model, I to represent the original sample image data, y to represent the standard segmentation result, and z to represent the reconstruction reference sample data, an overall optimization function for the classification model and the segmentation model during adversarial training is expressed as Formula 4.

$$\min_{G}\max_{D} V(D, G) \quad \text{(Formula 4)}$$

$$V(D, G) = E_y[\log D(y, I)] + E_z[\log(1 - D(G(z, I)))] + \|G(z, I) - y\|_2$$

For the meaning of the parameters involved in Formula 4, see Formula 2 and Formula 3. In the process of adversarial training based on the overall optimization function shown in Formula 4, the parameters of the segmentation model G are firstly fixed, and the parameters of the classification model D are updated. Therefore, the classification model D may make the probability value that the predicted segmentation result is the correct segmentation result included in the reconstruction confidence information determined based on the predicted segmentation result as close to 0 as possible, and the probability value that the standard segmentation result is the correct segmentation result included in the reconstruction confidence information determined based on the standard segmentation result as close to 1 as possible. Then, the parameters of the classification model D are fixed, and the parameters of the segmentation model G are updated, so that the predicted segmentation result predicted by the segmentation model G is as close to the standard segmentation result as possible, and the classification model D may make the probability value that the predicted segmentation result is the correct segmentation result included in the reconstruction confidence information determined based on the predicted segmentation result close to 1.

The above description is only an exemplary description of the manner for obtaining the target classification model and the target segmentation model by training, and the embodiments of this application is not limited thereto. Exemplarily, the target segmentation model and the target classification model may also be obtained by separate training, as long as the target segmentation model may predict accurate segmentation results based on the original image data and the reconstruction reference data, and the target classification model may predict accurate reconstruction confidence information based on the original image data and the segmentation result.

In an exemplary embodiment, the embodiments of this application updates the parameters of the models in the training process by adopting a gradient descent method based on an Adam (a stochastic optimization algorithm) optimization algorithm. Betas (decay) in Adam=(0.95, 0.9995), that is, the exponential decay rate of first-order moment estimation is 0.95, and the exponential decay rate of second-order moment estimation is 0.995. Weight decay is not used. During training, the initial learning rate is set to be 0.10001, and is reduced to one-tenth every 10 epochs, and training is performed for a total of 50 epochs. In order to avoid overfitting, a drop out layer is added between any two fully connected layers, and the dropout rate is set to be 0.5, that is, at each iteration, only 50% of randomly selected features are used for training.

Step 203: Reconstruct the target dendritic tissue in the target image based on the target segmentation result to obtain the complete reconstruction result of the target dendritic tissue in the target image.

The target segmentation result may indicate whether each pixel in the target image belongs to the target dendritic tissue. After the target segmentation result is obtained, the target dendritic tissue may be automatically reconstructed in the target image based on the target segmentation result, and a reconstruction result is used as the complete reconstruction result of the target dendritic tissue in the target image.

In a possible implementation, manners for reconstructing the target dendritic tissue in the target image based on the target segmentation result include, but are not limited to, the following two.

Manner 1: Reconstruct the target dendritic tissue in the target image directly based on the target segmentation result.

In this manner 1, all the pixels belonging to the target dendritic tissue are determined directly based on the target category of each pixel indicated by the target segmentation result, and each pixel belonging to the target dendritic tissue corresponds to a node of the target dendritic tissue. The nodes of the target dendritic tissue are marked in the target image directly according to all the pixels belonging to the target dendritic tissue, such that the process of reconstructing the target dendritic tissue in the target image directly based on the target segmentation result is realized. In an exemplary embodiment, in addition to marking the nodes of the target dendritic tissue in the target image, a connection relationship among the nodes of the target dendritic tissue is also marked, such that the process of reconstructing the target dendritic tissue in the target image directly based on the target segmentation result is realized.

When the target dendritic tissue is the target neuron, the nodes of the target dendritic tissue refer to neuron nodes of the target neuron. When the target dendritic tissue is the target blood vessel, the nodes of the target dendritic tissue refer to vessel nodes of the target vessel.

Manner 2: Reconstruct the target dendritic tissue in the target image based on the target segmentation result and the local reconstruction result of the target dendritic tissue in the target image.

In this manner 2, the process of reconstructing the target dendritic tissue in the target image is realized based on the target segmentation result and the local reconstruction result of the target dendritic tissue in the target image. In this way, the process of reconstructing the target dendritic tissue in the target image is equivalent to a process of supplementing a marking result indicated by the local reconstruction result of the target dendritic tissue in the target image.

In a possible implementation, the process of reconstructing the target dendritic tissue in the target image based on the target segmentation result and the local reconstruction result of the target dendritic tissue in the target image is: determine all the pixels belonging to the target dendritic tissue based on the target segmentation result; determine reconstructed pixels based on the local reconstruction result of the target dendritic tissue in the target image; and mark other nodes of the target dendritic tissue in the target image based on the marking result indicated by the local reconstruction result of the target dendritic tissue in the target image and other pixels except the reconstructed pixels in all the pixels belonging to the target dendritic tissue. In an exemplary embodiment, in addition to marking other nodes of the target dendritic tissue in the target image, a connection relationship among other nodes is also marked.

Regardless of which manner is used for reconstruction, a target marking result may be obtained after the process of reconstructing the target dendritic tissue in the target image is completed. The target marking result is a complete marking result of the target dendritic tissue in the target image. After the target marking result is obtained, the complete reconstruction result of the target dendritic tissue in the target image is obtained based on the target marking result. In an exemplary embodiment, a manner for acquiring the complete reconstruction result of the target dendritic tissue in the target image based on the target marking result is: use the target image including the target marking result as the complete reconstruction result of the target dendritic tissue in the target image. In another exemplary embodiment, a manner for obtaining the complete reconstruction result of the target dendritic tissue in the target image based on the target marking result is: determine relevant data of each node of the target dendritic tissue based on the target marking result, and use a file including the relevant data of each node as the complete reconstruction result of the target dendritic tissue in the target image.

In an exemplary embodiment, the target dendritic tissue may be the target neuron or the target blood vessel, and the embodiments of this application takes the target dendritic tissue being the target neuron as an example for description. When the target dendritic tissue is the target neuron, the target category of any pixel is used for indicating that the pixel belongs to the target neuron or that the pixel does not belong to the target neuron. In this case, the process of reconstructing the target dendritic tissue in the target image based on the target segmentation result to obtain the complete reconstruction result of the target dendritic tissue in the target image includes the following steps: determine target pixels belonging to the target neuron of the pixels in the target image based on the target segmentation result; mark the neuron nodes of the target neuron and a connection relationship among the neuron nodes of the target neuron in the target image based on the target pixels to obtain the target marking result; and acquire the complete reconstruction result of the target neuron in the target image based on the target marking result.

The target pixels refer to pixels, all belonging to the target neuron, of the pixels in the target image. In a possible implementation, the implementation of marking the neuron nodes of the target neuron and the connection relationship among the neuron nodes of the target neuron in the target image based on the target pixels to obtain the target marking result is: mark all the neuron nodes of the target neuron and the connection relationship among all the neuron nodes of the target neuron in the target image directly according to the target pixels to obtain the target marking result.

In another possible implementation, the implementation of marking the neuron nodes of the target neuron and the connection relationship among the neuron nodes of the target neuron in the target image based on the target pixels to obtain the target marking result is: determine the reconstructed pixels based on the local reconstruction result of the target neuron in the target image; mark other neuron nodes of the target neuron and the connection relationship among other neuron nodes in the target image based on the marking result indicated by the local reconstruction result of the target neuron in the target image and other pixels except the reconstructed pixels in the target pixels to obtain the target marking result.

Figure 7:
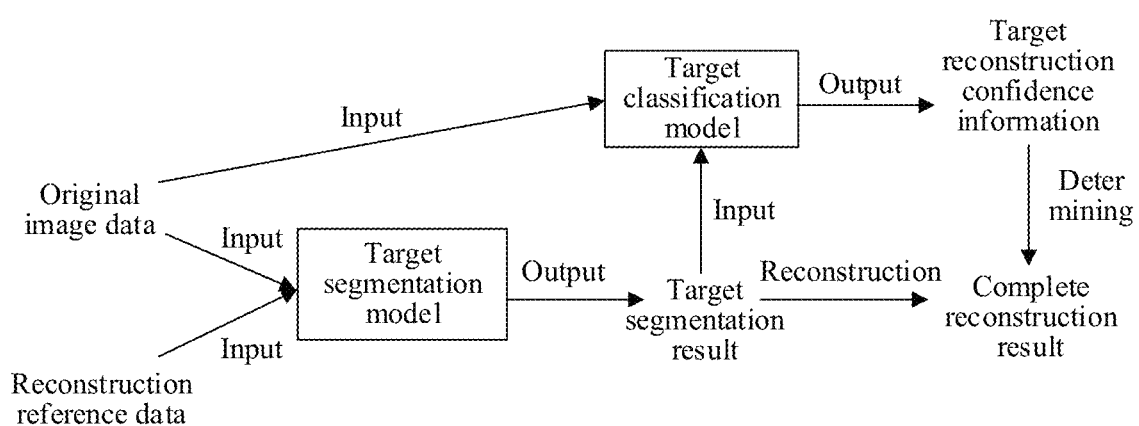
FIG. 7 is a schematic diagram of a process of reconstructing a dendritic tissue in an image provided by an embodiment of this application.

In an exemplary embodiment, the process of reconstructing the dendritic tissue in the image is shown in FIG. 7. The original image data and reconstruction reference data corresponding to the target image are inputted into the target segmentation model for processing to obtain the target segmentation result corresponding to the target image outputted by the target segmentation model. The target segmentation result corresponding to the target image and the original image data corresponding to the target image are inputted into the target classification model for processing to obtain the target reconstruction confidence information outputted by the target classification model. The target dendritic tissue is reconstructed in the target image based on the target segmentation result corresponding to the target image to obtain the complete reconstruction result of the target dendritic tissue in the target image. The reliability of the complete reconstruction result of the target dendritic tissue in the target image is determined according to the target reconstruction confidence information, and then the researchers correct complete reconstruction results with relatively low reliability.

Figure 8:
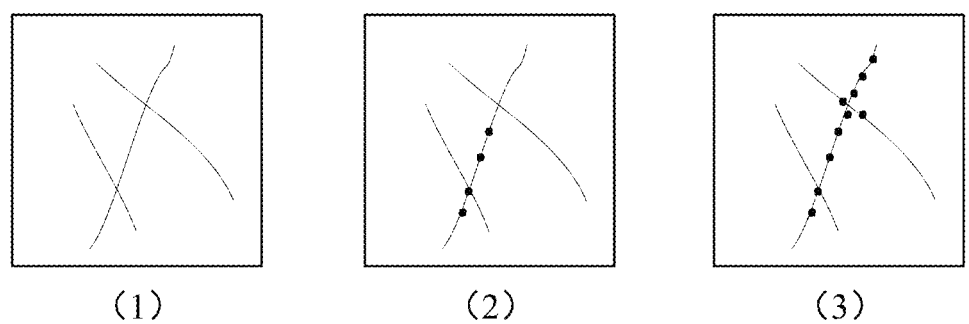
FIG. 8 is a schematic diagram of a target image including different marking results provided by an embodiment of this application.

In an exemplary embodiment, a marking result indicated by the complete reconstruction result of the target dendritic tissue in the target image adds new nodes compared with the marking result indicated by the local reconstruction result of the target dendritic tissue in the target image. Exemplarily, schematic diagrams of a target image that does not include any marking result, a target image that includes the marking result indicated by the local reconstruction result of the target dendritic tissue in the target image, and a target image that includes the marking result indicated by the complete reconstruction result of the target dendritic tissue in the target image are shown in FIG. 8(1), FIG. 8(2), and FIG. 8(3) respectively. The number of nodes marked in the target image shown in FIG. 8(3) is greater than the number of nodes marked in the target image shown in FIG. 8(2).

In a possible implementation, the target image is a starting local image corresponding to the target dendritic tissue in an initial image including a complete target dendritic tissue, that is, the target image includes a starting part of the complete target dendritic tissue. In this case, after the complete reconstruction result of the target dendritic tissue in the target image is obtained, the method further includes the following steps 204 to 205.

Step 204: In response to that the complete reconstruction result of the target dendritic tissue in the target image does not meet a reconstruction termination condition, acquire a next local image corresponding to the target dendritic tissue in the initial image based on the complete reconstruction result of the target dendritic tissue in the target image, and obtain a complete reconstruction result of the target dendritic tissue in the next local image.

After the complete reconstruction result of the target dendritic tissue in the target image is obtained, whether the complete reconstruction result of the target dendritic tissue in the target image meets the reconstruction termination condition is determined. A manner for determining whether the complete reconstruction result of the target dendritic tissue in the target image meets the reconstruction termination condition is set according to experience, or flexibly adjusted according to an application scenario, which is not limited in the embodiments of this application.

In an exemplary embodiment, the manner for determining whether the complete reconstruction result of the target dendritic tissue in the target image meets the reconstruction termination condition is: in response to that the complete reconstruction result of the target dendritic tissue in the target image having no supplementary reconstruction result except the local reconstruction result of the target dendritic tissue in the target image, determine that the complete reconstruction result of the target dendritic tissue in the target image meets the reconstruction termination condition; and in response to that the complete reconstruction result of the target dendritic tissue in the target image having supplementary reconstruction results except the local reconstruction result of the target dendritic tissue in the target image, determine that the complete reconstruction result of the target dendritic tissue in the target image does not meet the reconstruction termination condition.

When the complete reconstruction result of the target dendritic tissue in the target image does not meet the reconstruction termination condition, a complete reconstruction result of the target dendritic tissue in the initial image may be obtained by continuing to perform reconstruction on the target dendritic tissue. A manner for continuing to perform reconstruction on the target dendritic tissue is: acquire the next local image corresponding to the target dendritic tissue in the initial image based on the complete reconstruction result of the target dendritic tissue in the target image, and obtain the complete reconstruction result of the target dendritic tissue in the next local image.

In an exemplary embodiment, a manner for acquiring the next local image corresponding to the target dendritic tissue in the initial image based on the complete reconstruction result of the target dendritic tissue in the target image is: determine a pixel, farthest from the starting pixel of the initial image, in the pixels belonging to the target dendritic tissue indicated by the complete reconstruction result of the target dendritic tissue in the target image as a specified pixel, and intercept an image of a target size as the next local image by taking the specified pixel as a center point.

The process of acquiring the complete reconstruction result of the target dendritic tissue in the next local image refers to the process of acquiring the complete reconstruction result of the target dendritic tissue in the target image described in steps 201 to 203, which will not be repeated here.

In an exemplary embodiment, when it is determined that the complete reconstruction result of the target dendritic tissue in the target image meets the reconstruction termination condition, the complete reconstruction result of the target dendritic tissue in the initial image is obtained directly based on the complete reconstruction result of the target dendritic tissue in the target image. Since the target image is a starting image corresponding to the target dendritic tissue in the initial image, the complete reconstruction result of the target dendritic tissue in the target image is directly used as the complete reconstruction result of the target dendritic tissue in the initial image.

Step 205: In response to that the complete reconstruction result of the target dendritic tissue in the next local image meets the reconstruction termination condition, acquire the complete reconstruction result of the target dendritic tissue in the initial image based on the acquired complete reconstruction result of the target dendritic tissue in each local image.

After the complete reconstruction result of the target dendritic tissue in the next local image is acquired, whether the complete reconstruction result of the target dendritic tissue in the next local image meets the reconstruction termination condition is determined. When the complete reconstruction result of the target dendritic tissue in the next local image meets the reconstruction termination condition, the complete reconstruction result of the target dendritic tissue in the initial image is acquired based on the acquired complete reconstruction result of the target dendritic tissue in each local image.

The complete reconstruction result of the target dendritic tissue in the initial image is a result obtained after completely marking the target dendritic tissue in the initial image. The acquired complete reconstruction result of the target dendritic tissue in each local image may indicate local target dendritic tissues marked in the initial image. The complete reconstruction results of the target dendritic tissue in two adjacent local images may overlap.

In a possible implementation, a manner for acquiring the complete reconstruction result of the target dendritic tissue in the initial image based on the acquired complete reconstruction result of the target dendritic tissue in each local image is: combine and process the acquired complete reconstruction result of the target dendritic tissue in each local image according to a relationship among the local images to obtain the complete reconstruction result of the target dendritic tissue in the initial image.

When the complete reconstruction result of the target dendritic tissue in the next local image does not meet the reconstruction termination condition, the following local image corresponding to the target dendritic tissue in the initial image continues to be acquired based on the complete reconstruction result of the target dendritic tissue in the next local image, a complete reconstruction result of the target dendritic tissue in the following local image is acquired, and the operation is repeated until a complete reconstruction result of the target dendritic tissue in a certain local image meets the reconstruction termination condition; and the complete reconstruction result of the target dendritic tissue in the initial image is acquired based on the acquired complete reconstruction result of the target dendritic tissue in each local image.

In a possible implementation, the complete reconstruction result of the target dendritic tissue in the initial image is stored after being acquired, such that the researchers can directly extract the result and perform further research. A manner for storing the complete reconstruction result of the target dendritic tissue in the initial image is not limited in the embodiments of this application.

In an exemplary embodiment, taking the dendritic tissue being a neuron as an example, reconstruction of neuron is performed based on a high-resolution three-dimensional brain image under a microscope. The length of a certain dimension of the reconstructed neuron may reach several thousand pixels. Even if only an image of a region where the neuron is located is intercepted, the image may occupy space of greater than 1 T (a capacity unit), while a single neuron only occupies a very small position in the image. In this way, the complete reconstruction result of the neuron is stored via an SWC (name of a file type) file. Each SWC file represents a neuron, and each line in the SWC file represents a neuron node in the neuron.

Figure 10:
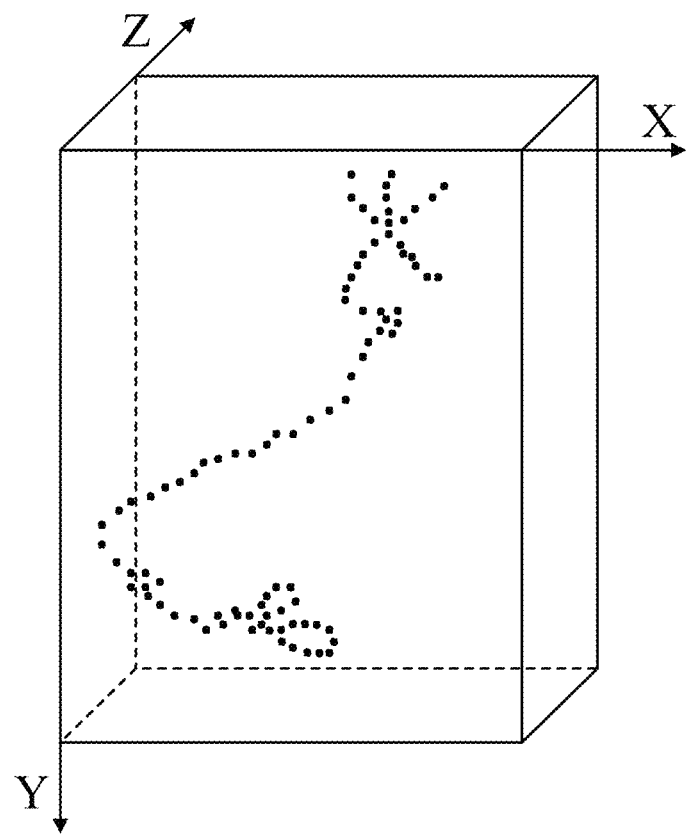
FIG. 10 is a schematic diagram of three-dimensional point cloud data provided by an embodiment of this application.

For example, the SWC file used for storing the complete reconstruction result of the neuron is shown in FIG. 9. The SWC file shown in FIG. 9 includes coordinates (x, y, z) of the neuron nodes in the image, a type of the neuron nodes, a radius (r) of the neuron nodes, a serial number (id) of the neuron nodes, and a serial number (pid) of a parent node of the neuron nodes. The serial number (id) of the neuron nodes and the serial number (pid) of the parent node of the neuron nodes may represent a connection relationship among the neuron nodes. For the neuron, the type of the neuron nodes is an axon or a dendrite, and a digital identifier may be used instead of a specific type in response to storing the type of the neuron nodes. In an exemplary embodiment, three-dimensional point cloud data as shown in FIG. 10 may be generated based on the SWC file storing the complete reconstruction result of the neuron.

In the embodiments of this application, a small image (for example, 32×32×32) is intercepted by taking a last node in the reconstructed nodes indicated by the local reconstruction result of the dendritic tissue as a center point, subsequent nodes of the dendritic tissue are predicted according to original image data and reconstruction reference data corresponding to the intercepted image, and then a next image is intercepted according to the subsequent nodes for supplementing until the dendritic tissue is completely reconstructed. Reconstruction confidence may be acquired by inputting the predicted segmentation result into the classification model, so as to determine whether the reconstruction result obtained based on the segmentation result is reliable. Based on the method provided by the embodiments of this application, automatic reconstruction of the dendritic tissue can be realized, the reconstruction speed and accuracy can be improved, and the reconstruction confidence information of the segmentation result can also be given, so as to help the researchers determine whether the reconstruction is reliable, and quickly locate image regions that may be incorrect and need manual correction.

In the embodiments of this application, the target segmentation result corresponding to the target image is automatically acquired based on the original image data and reconstruction reference data corresponding to the target image, and then the complete reconstruction result of the target dendritic tissue in the target image is automatically obtained based on the target segmentation result. In this way, automatic reconstruction of the dendritic tissue can be realized, and the reconstruction process of the dendritic tissue does not need to relay on manual labor, which is beneficial to improving the efficiency of reconstructing the dendritic tissue in the image, and the reliability of the obtained reconstruction result of the dendritic tissue is relatively high.

Figure 11:
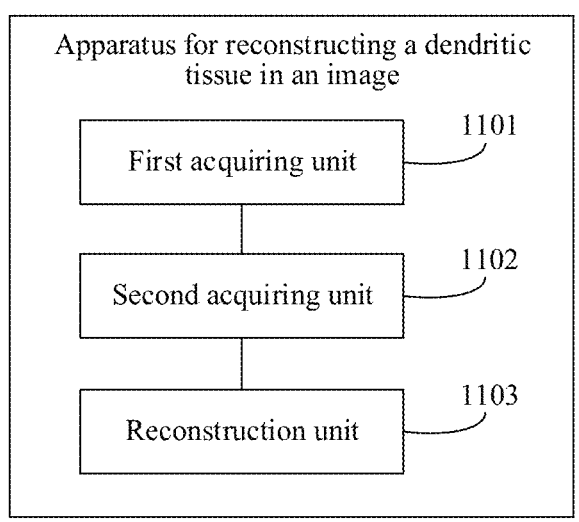
FIG. 11 is a schematic diagram of an apparatus for reconstructing a dendritic tissue in an image provided by an embodiment of this application.

Referring to FIG. 11, an embodiment of this application provides an apparatus for reconstructing a dendritic tissue in an image. The apparatus includes:

a first acquiring unit 1101, configured to acquire a target image corresponding to a target dendritic tissue, original image data corresponding to the target image, and reconstruction reference data corresponding to the target image, the reconstruction reference data being determined based on a local reconstruction result of the target dendritic tissue in the target image;

a second acquiring unit 1102, configured to call a target segmentation model to acquire a target segmentation result corresponding to the target image based on the original image data and the reconstruction reference data, the target segmentation result being used for indicating a target category of each pixel in the target image, and the target category of any pixel being used for indicating that the pixel belongs to the target dendritic tissue or that the pixel does not belong to the target dendritic tissue; and a reconstruction unit 1103, configured to reconstruct the target dendritic tissue in the target image based on the target segmentation result to obtain a complete reconstruction result of the target dendritic tissue in the target image.

In a possible implementation, the second acquiring unit 1102 is configured to call the target segmentation model to perform a first reference number of times of downsampling processing in sequence based on fusion data of the original image data and the reconstruction reference data to obtain a first target feature corresponding to the target image; perform the first reference number of times of upsampling processing in sequence based on a target convolution feature corresponding to the first target feature to obtain a second target feature corresponding to the target image; and perform target convolution processing on the second target feature to obtain the target segmentation result corresponding to the target image.

In a possible implementation, the first reference number of times is three times, and any downsampling processing includes one convolution processing and one pooling processing. The second acquiring unit 1102 is further configured to perform first convolution processing on the fusion data of the original image data and the reconstruction reference data to obtain a first convolution feature corresponding to the target image; perform first pooling processing on the first convolution feature to obtain a first pooling feature corresponding to the target image; perform second convolution processing on the first pooling feature to obtain a second convolution feature corresponding to the target image; perform second pooling processing on the second convolution feature to obtain a second pooling feature corresponding to the target image; perform third convolution processing on the second pooling feature to obtain a third convolution feature corresponding to the target image; and perform third pooling processing on the third convolution feature to obtain the first target feature corresponding to the target image.

In a possible implementation, any upsampling processing includes one deconvolution processing and one convolution processing. The second acquiring unit 1102 is further configured to perform first deconvolution processing on the target convolution feature corresponding to the first target feature to obtain a first upsampling feature corresponding to the target image; perform fourth convolution processing on a spliced feature of the first upsampling feature and the third convolution feature to obtain a fourth convolution feature corresponding to the target image; perform second deconvolution processing on the fourth convolution feature to obtain a second upsampling feature corresponding to the target image; perform fifth convolution processing on a spliced feature of the second upsampling feature and the second convolution feature to obtain a fifth convolution feature corresponding to the target image; perform third deconvolution processing on the fifth convolution feature to obtain a third upsampling feature corresponding to the target image; and perform sixth convolution processing on a spliced feature of the third upsampling feature and the first convolution feature to obtain the second target feature corresponding to the target image.

Figure 12:
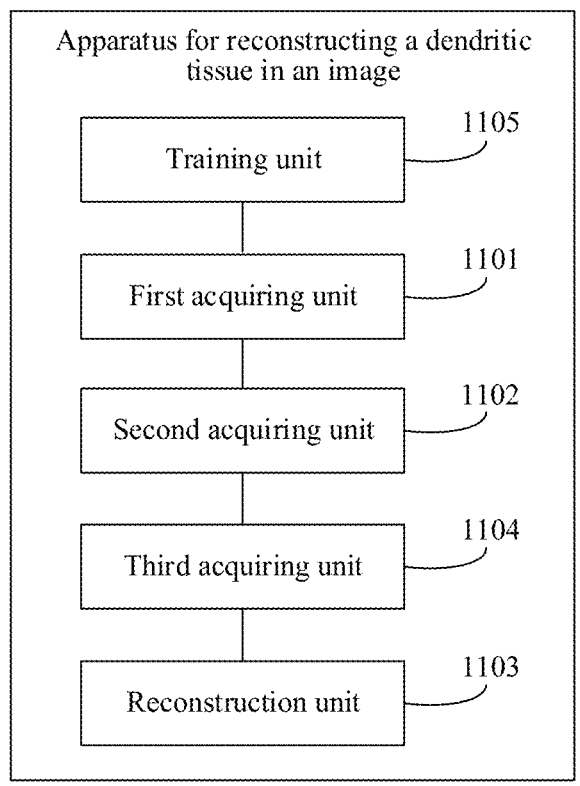
FIG. 12 is a schematic diagram of another apparatus for reconstructing a dendritic tissue in an image provided by an embodiment of this application.

In a possible implementation, referring to FIG. 12, the apparatus further includes:

a third acquiring unit 1104, configured to call a target classification model to acquire target reconstruction confidence information based on the original image data and the target segmentation result.

In a possible implementation, the target classification model includes at least one convolution sub-model, at least one fully connected sub-model and a confidence prediction sub-model connected in sequence. The third acquiring unit 1104 is configured to input the original image data and the target segmentation result into a first convolution sub-model in the target classification model for processing to obtain a classification feature outputted by the first convolution sub-model; input, beginning from a second convolution sub-model, a classification feature outputted by a previous convolution sub-model into a next convolution sub-model for processing to obtain a classification feature outputted by the next convolution sub-model; input a classification feature outputted by a last convolution sub-model into a first fully connected sub-model for processing to obtain a fully connected feature outputted by the first fully connected sub-model; input, beginning from a second fully connected sub-model, a fully connected feature outputted by a previous fully connected sub-model into a next fully connected sub-model for processing to obtain a fully connected feature outputted by the next fully connected sub-model; and input a fully connected feature outputted by a last fully connected sub-model into the confidence prediction sub-model for processing to obtain the target reconstruction confidence information outputted by the confidence prediction sub-model.

In a possible implementation, the first acquiring unit 1101 is further configured to acquire at least one sample image, original sample image data respectively corresponding to the at least one sample image, reconstruction reference sample data respectively corresponding to the at least one sample image, and standard segmentation results respectively corresponding to the at least one sample image.

Referring to FIG. 12, the apparatus further includes:

a training unit 1105, configured to perform supervised training on an initial segmentation model based on the original sample image data respectively corresponding to the at least one sample image, the reconstruction reference sample data respectively corresponding to the at least one sample image, and the standard segmentation results respectively corresponding to the at least one sample image to obtain the target segmentation model.

In a possible implementation, the first acquiring unit 1101 is further configured to acquire at least one sample image, original sample image data respectively corresponding to the at least one sample image, reconstruction reference sample data respectively corresponding to the at least one sample image, and standard segmentation results respectively corresponding to the at least one sample image.

The training unit 1105 is further configured to perform adversarial training on an initial segmentation model and an initial classification model based on the original sample image data respectively corresponding to the at least one sample image, the reconstruction reference sample data respectively corresponding to the at least one sample image, and the standard segmentation results respectively corresponding to the at least one sample image to obtain the target segmentation model and the target classification model.

In a possible implementation, the training unit 1105 is further configured to call the initial segmentation model to acquire a predicted segmentation result corresponding to a first sample image in the at least one sample image based on original sample image data corresponding to the first sample image and reconstruction reference sample data corresponding to the first sample image; call the initial classification model to acquire first reconstruction confidence information based on the original sample image data corresponding to the first sample image and the predicted segmentation result corresponding to the first sample image, and to acquire second reconstruction confidence information based on the original sample image data corresponding to the first sample image and a standard segmentation result corresponding to the first sample image; determine a first loss function based on the first reconstruction confidence information and the second reconstruction confidence information; update parameters of the initial classification model based on the first loss function; obtain a first classification model in response to that an updating process of the parameters of the initial classification model meets a first termination condition; call the initial segmentation model to acquire a predicted segmentation result corresponding to a second sample image in the at least one sample image based on original sample image data corresponding to the second sample image and reconstruction reference sample data corresponding to the second sample image; call the first classification model to acquire third reconstruction confidence information based on the original sample image data corresponding to the second sample image and the predicted segmentation result corresponding to the second sample image; determine a second loss function based on the third reconstruction confidence information, the predicted segmentation result corresponding to the second sample image, and a standard segmentation result corresponding to the second sample image; update parameters of the initial segmentation model based on the second loss function; obtain a first segmentation model in response to that an updating process of the parameters of the initial segmentation model meets a second termination condition; and in response to that an adversarial training process does not meet a target termination condition, continue to perform adversarial training on the first classification model and the first segmentation model until the adversarial training process meets the target termination condition, so as to obtain the target classification model and the target segmentation model.

In a possible implementation, the first acquiring unit 1101 is further configured to, in response to that the complete reconstruction result of the target dendritic tissue in the target image does not meet a reconstruction termination condition, acquire a next local image corresponding to the target dendritic tissue in the initial image based on the complete reconstruction result of the target dendritic tissue in the target image; acquire a complete reconstruction result of the target dendritic tissue in the next local image; and in response to that the complete reconstruction result of the target dendritic tissue in the next local image meets the reconstruction termination condition, acquire the complete reconstruction result of the target dendritic tissue in the initial image based on the acquired complete reconstruction result of the target dendritic tissue in each local image.

In a possible implementation, the target dendritic tissue is a target neuron, and the target image is acquired from a three-dimensional brain image including the target neuron.

In a possible implementation, the target category of any pixel is used for indicating that the pixel belongs to the target neuron or that the pixel does not belong to the target neuron.

The reconstruction unit 1103 is configured to determine target pixels belonging to the target neuron of the pixels in the target image based on the target segmentation result; mark neuron nodes of the target neuron and a connection relationship among the neuron nodes of the target neuron based on the target pixels to obtain a target marking result; and acquire a complete reconstruction result of the target neuron in the target image based on the target marking result.

In the embodiments of this application, the target segmentation result corresponding to the target image is automatically acquired based on the original image data and reconstruction reference data corresponding to the target image, and then the complete reconstruction result of the target dendritic tissue in the target image is automatically obtained based on the target segmentation result. In this way, automatic reconstruction of the dendritic tissue can be realized, and the reconstruction process of the dendritic tissue does not need to relay on manual labor, which is beneficial to improving the efficiency of reconstructing the dendritic tissue in the image, and the reliability of the obtained reconstruction result of the dendritic tissue is relatively high.

It should be noted that, when the apparatus provided in the foregoing embodiments implements functions of the apparatus, it is illustrated with an example of division of each function module. In the practical application, the function distribution may be finished by different function modules according to the requirements, that is, divide the internal structure of the equipment into different function modules, so as to finish all or part of the functions described above. In addition, the apparatus and method embodiments provided in the foregoing embodiments belong to the same conception. For the specific implementation process, reference may be made to the method embodiments, and details are not described herein again.

Figure 13:
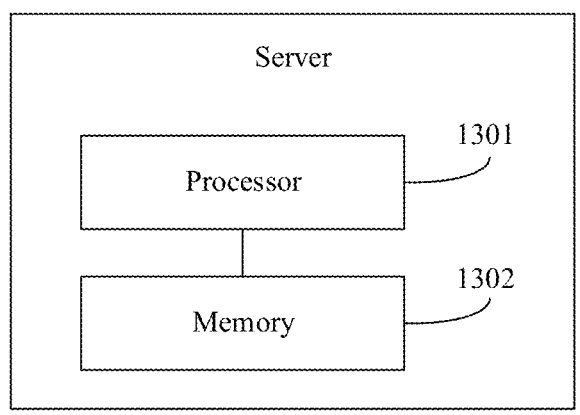
FIG. 13 is a schematic structural diagram of a server provided by an embodiment of this application.

FIG. 13 is a schematic structural diagram of a server according to an embodiment of this application. The server may vary greatly because a configuration or performance varies, and may include one or more central processing units (CPU) 1301 and one or more memories 1302. The one or more memories 1302 store at least one program code, and the at least one program code is loaded and executed by the one or more processors 1301 to implement the method for reconstructing a dendritic tissue in an image provided in the foregoing various method embodiments. Certainly, the server may also have a wired or wireless network interface, a keyboard, an input/output interface and other components to facilitate input/output. The server may also include other components for implementing device functions. Details are not described herein again.

Figure 14:
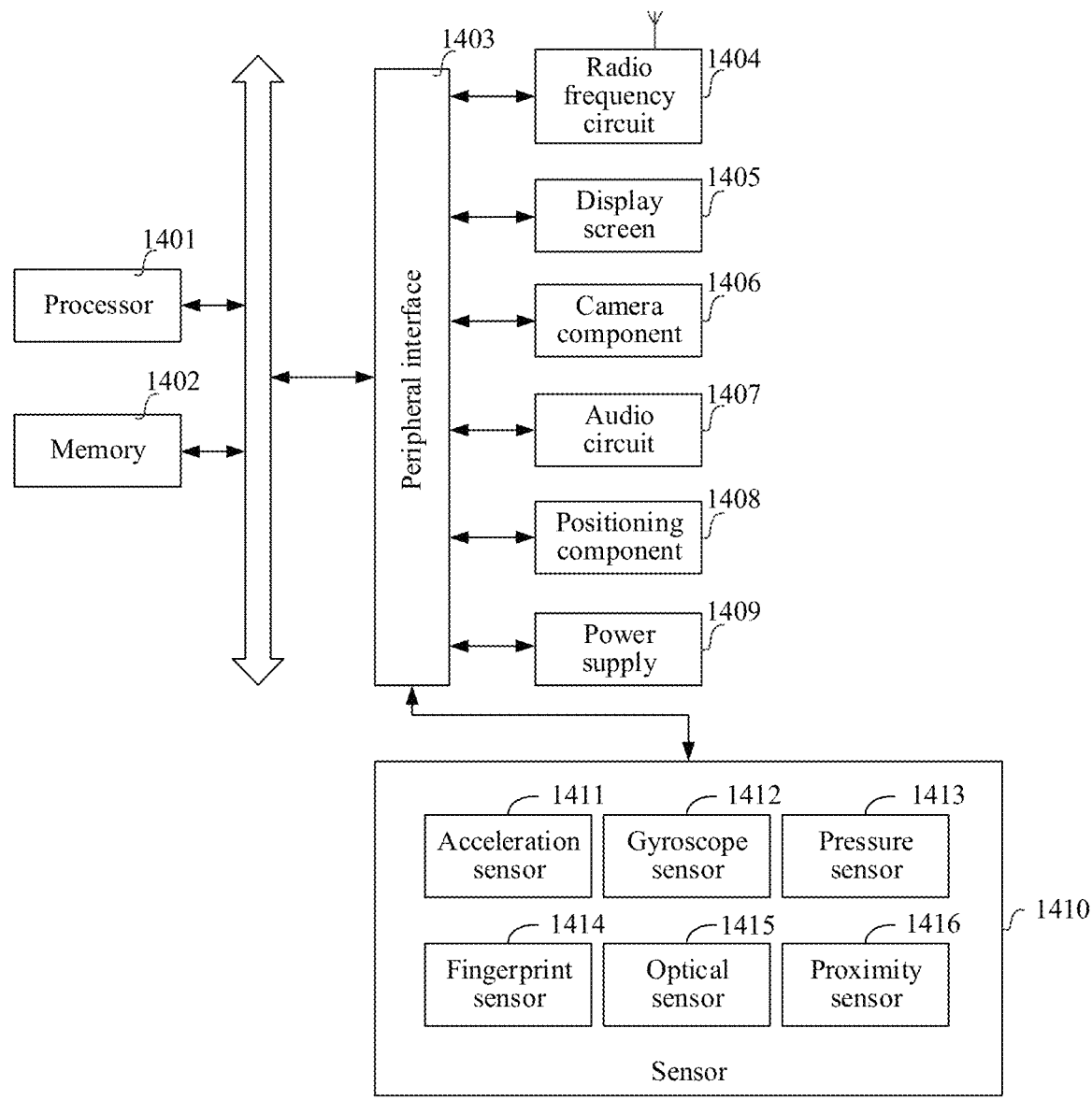
FIG. 14 is a schematic structural diagram of a terminal provided by an embodiment of this application.

FIG. 14 is a schematic structural diagram of a terminal provided by an embodiment of this application. For example, the terminal is a smartphone, a tablet computer, a notebook computer, or a desktop computer. The terminal may also be referred to as user equipment, a portable terminal, a laptop terminal, or a desktop terminal, among other names.

Generally, the terminal includes a processor 1401 and a memory 1402.

The processor 1401 may include one or more processing cores, for example, a 4-core processor or an 8-core processor. The processor 1401 may be implemented in at least one hardware form of a digital signal processor (DSP), a field programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1401 may be integrated with a graphics processing unit (GPU). The GPU is configured to render and draw content that needs to be displayed on a display. In some embodiments, the processor 1401 may further include an artificial intelligence (AI) processor. The AI processor is configured to process computing operations related to machine learning.

The memory 1402 may include one or more computer-readable storage media that may be non-transitory. The memory 1402 may further include a high-speed random access memory and a non-volatile memory, for example, one or more disk storage devices or flash storage devices. In some embodiments, the non-transitory computer-readable storage medium in the memory 1402 is configured to store at least one instruction, and the at least one instruction being configured to be executed by the processor 1401 to implement the method for reconstructing a dendritic tissue in an image provided in the method embodiments of this application.

In some embodiments, the terminal may further include a peripheral device interface 1403 and at least one peripheral device. The processor 1401, the memory 1402, and the peripheral interface 1403 may be connected through a bus or a signal cable. Each peripheral may be connected to the peripheral interface 1403 through a bus, a signal cable, or a circuit board. Specifically, the peripheral includes at least one of a radio frequency (RF) circuit 1404, a display screen 1405, a camera assembly 1406, an audio circuit 1407, a positioning component 1408, and a power supply 1409.

The peripheral interface 1403 may be configured to connect at least one peripheral related to input/output (I/O) to the processor 1401 and the memory 1402. In some embodiments, the processor 1401, the memory 1402 and the peripheral device interface 1403 are integrated on the same chip or circuit board. In some other embodiments, any one or two of the processor 1401, the memory 1402, and the peripheral device interface 1403 may be implemented on a single chip or circuit board. This is not limited in this embodiment.

The radio frequency circuit 1404 is configured to receive and transmit a radio frequency (RF) signal, which is also referred to as an electromagnetic signal. The RF circuit 1404 communicates with a communication network and another communication device by using the electromagnetic signal. The RF circuit 1404 converts an electric signal into an electromagnetic signal for transmission, or converts a received electromagnetic signal into an electric signal. Optionally, the radio frequency circuit 1404 includes an antenna system, an RF transceiver, one or more amplifiers, a tuner, an oscillator, a digital signal processor, a codec chip set, a subscriber identity module card, and the like. The RF circuit 1404 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF 1404 may further include a circuit related to near field communication (NFC), which is not limited in this application.

The display screen 1405 is configured to display a UI. The UI may include a graph, a text, an icon, a video, and any combination thereof. When the display screen 1405 is a touch display screen, the display screen 1405 further has a capability of acquiring a touch signal on or above a surface of the display screen 1405. The touch signal may be used as a control signal to be inputted to the processor 1401 for processing. In this case, the display screen 1405 may be further configured to provide a virtual button and/or a virtual keyboard that are/is also referred to as a soft button and/or a soft keyboard. In some embodiments, there may be one display screen 1405 disposed on a front panel of the terminal. In some other embodiments, there may be at least two display screens 1405 respectively disposed on different surfaces of the terminal or designed in a foldable shape. In still some other embodiments, the display screen 1405 may be a flexible display screen, disposed on a curved surface or a folded surface of the terminal. Even, the display screen 1405 may be further set in a non-rectangular irregular pattern, namely, a special-shaped screen. The display screen 1405 may be prepared by using materials such as a liquid-crystal display (LCD), an organic light-emitting diode (OLED), or the like.

The camera assembly 1406 is configured to acquire an image or a video. Optionally, the camera assembly 1406 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and VR shooting functions through fusion of the main camera and wide-angle camera, or another fusion shooting function. In some embodiments, the camera assembly 1406 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 1407 may include a microphone and a speaker. The microphone is configured to acquire sound waves of a user and an environment, and convert the sound waves into an electrical signal to input to the processor 1401 for processing, or input to the radio frequency circuit 1404 for implementing voice communication. For the purpose of stereo sound acquisition or noise reduction, there may be a plurality of microphones, respectively disposed at different portions of the terminal. The microphone may be further an array microphone or an omnidirectional collection microphone. The speaker is configured to convert electric signals from the processor 1401 or the RF circuit 1404 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 1407 may further include an earphone jack.

The positioning assembly 1408 is configured to position a current geographic location of the terminal, to implement a navigation or a location based service (LBS). The positioning component 1408 may be a positioning component based on the global positioning system (GPS) of the United States, the COMPASS System of China, the GLONASS System of Russia, or the GALILEO System of the European Union.

The power supply 1409 is configured to supply power to assemblies in the terminal. The power supply 1409 may be an alternating current, a direct current, a primary battery, or a rechargeable battery. When the power supply 1409 includes the rechargeable battery, the rechargeable battery may be a wired rechargeable battery or a wireless rechargeable battery. The rechargeable battery may be further configured to support a fast charge technology.

In some embodiments, the terminal further includes one or more sensors 1410. The one or more sensors 1410 include, but are not limited to, an acceleration sensor 1411, a gyroscope sensor 1412, a pressure sensor 1413, a fingerprint sensor 1414, an optical sensor 1415, and a proximity sensor 1416.

The acceleration sensor 1411 can detect acceleration sizes on three coordinate shafts of a coordinate system established based on the terminal. For example, the acceleration sensor 1411 may be configured to detect components of gravity acceleration on the three coordinate axes. The processor 1401 may control, according to a gravity acceleration signal acquired by the acceleration sensor 1411, the display screen 1405 to display the user interface in a frame view or a portrait view. The acceleration sensor 1411 may be further configured to acquire motion data of a game or a user.

The gyroscope sensor 1412 may detect a body direction and a rotation angle of the terminal, and the gyroscope sensor 1412 may work with the acceleration sensor 1411 to acquire a 3D action performed by the user on the terminal. The processor 1401 may implement the following functions according to the data acquired by the gyroscope sensor 1412: motion sensing (such as changing the UI according to a tilt operation of the user), image stabilization at shooting, game control, and inertial navigation.

The pressure sensor 1413 may be disposed at a side frame of the terminal and/or a lower layer of the display screen 1405. When the pressure sensor 1413 is disposed at the side frame of the terminal, a holding signal of the user for the terminal can be detected for the processor 1401 to perform left and right hand recognition or quick operations according to the holding signal acquired by the pressure sensor 1413. When the pressure sensor 1413 is disposed on the low layer of the display screen 1405, the processor 1401 controls, according to a pressure operation of the user on the display screen 1405, an operable control on the UI. The operable control includes at least one of a button control, a scroll-bar control, an icon control, and a menu control.

The fingerprint sensor 1414 is configured to collect a fingerprint of the user. The processor 1401 identifies an identity of the user according to the fingerprint collected by the fingerprint sensor 1414, or the fingerprint sensor 1414 identifies an identity of the user according to the collected fingerprint. When identifying that the identity of the user is a trusted identity, the processor 1401 authorizes the user to perform related sensitive operations. The sensitive operations include: unlocking a screen, viewing encrypted information, downloading software, paying, changing a setting, and the like. The fingerprint sensor 1414 may be disposed on a front surface, a back surface, or a side surface of the terminal. When a physical button or a vendor logo is disposed on the terminal, the fingerprint sensor 1414 may be integrated with the physical button or the vendor logo.

The optical sensor 1415 is configured to acquire ambient light intensity. In an embodiment, the processor 1401 may control display luminance of the display screen 1405 according to the ambient light intensity collected by the optical sensor 1415. Specifically, when the ambient light intensity is relatively high, the display luminance of the display screen 1405 is increased. When the ambient light intensity is relatively low, the display luminance of the display screen 1405 is reduced. In another embodiment, the processor 1401 may further dynamically adjust a camera parameter of the camera assembly 1406 according to the ambient light intensity acquired by the optical sensor 1415.

The proximity sensor 1416 is also referred to as a distance sensor and is generally disposed at the front panel of the terminal. The proximity sensor 1416 is configured to acquire a distance between the user and the front face of the terminal. In an embodiment, when the proximity sensor 1416 detects that the distance between the user and the front surface of the terminal gradually becomes smaller, the display screen 1405 is controlled by the processor 1401 to switch from a screen-on state to a screen-off state. When the proximity sensor 1416 detects that the distance between the user and the front surface of the terminal gradually becomes larger, the display screen 1405 is controlled by the processor 1401 to switch from the screen-off state to the screen-on state.

A person skilled in the art may understand that a structure shown in FIG. 14 constitutes no limitation on the terminal. The terminal may include more or fewer assemblies than those shown in the drawings, some assemblies may be combined, and a different assembly may be used to construct the device.

In an exemplary embodiment, a computer device is further provided. The computer device includes a processor and a memory. The memory stores at least one program code. The at least one program code is loaded and executed by one or more processors to implement any one of the above methods for reconstructing a dendritic tissue in an image.

In an exemplary embodiment, a computer-readable storage medium is further provided. The computer-readable storage medium stores at least one program code loaded and executed by a processor of a computer device to implement the method for reconstructing a dendritic tissue in an image described in any one of above.

In a possible implementation, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method for reconstructing a dendritic tissue in an image described in any one of the above.

In this specification and the claims of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. The implementations described in the foregoing exemplary embodiments do not represent all implementations that are consistent with this application. On the contrary, the implementations are merely examples of apparatuses and methods that are described in detail in the appended claims and that are consistent with some aspects of this application.

A plurality of mentioned in the specification means two or more. "And/or" describes an association relationship for associated objects and represents that three relationships may exist. For example, A and/or B may represent the following three cases: only A exists, both A and B exist, and only B exists. The character "l" generally indicates an "or" relationship between the associated objects.

The foregoing descriptions are merely exemplary embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for reconstructing a dendritic tissue in an image performed by a computer device, the method comprising:
   acquiring original image data corresponding to a target image of a target dendritic tissue and reconstruction reference data corresponding to the target image, the reconstruction reference data being determined based on a local reconstruction result of the target dendritic tissue in the target image;
   applying a target segmentation model to the original image data and the reconstruction reference data to acquire a target segmentation result corresponding to the target image, the target segmentation result being used for indicating a target category of each pixel in the target image, and the target category of any pixel being used for indicating that the pixel belongs to the target dendritic tissue or that the pixel does not belong to the target dendritic tissue, wherein the target segmentation model is trained by: acquiring original sample image data respectively corresponding to at least one sample image, reconstruction reference sample data respectively corresponding to the at least one sample image, and standard segmentation results respectively corresponding to the at least one sample image; and performing supervised training on an initial segmentation model based on the original sample image data respectively corresponding to the at least one sample image, the reconstruction reference sample data respectively corresponding to the at least one sample image, and the standard segmentation results respectively corresponding to the at least one sample image to obtain the target segmentation model; and
   reconstructing the target dendritic tissue in the target image based on the target segmentation result to obtain a complete reconstruction result of the target dendritic tissue in the target image.

2. The method according to claim 1, wherein the applying a target segmentation model to the original image data and the reconstruction reference data to acquire a target segmentation result corresponding to the target image comprises:
   performing a first reference number of times of downsampling processing in sequence based on fusion data of the original image data and the reconstruction reference data to obtain a first target feature corresponding to the target image;
   performing the first reference number of times of upsampling processing in sequence based on a target convolution feature corresponding to the first target feature to obtain a second target feature corresponding to the target image; and
   performing target convolution processing on the second target feature to obtain the target segmentation result corresponding to the target image.

3. The method according to claim 1, wherein the method further comprises:
   applying a target classification model the original image data and the target segmentation result to acquire target reconstruction confidence information.

4. The method according to claim 3, wherein the method further comprises:
   acquiring original sample image data respectively corresponding to at least one sample image, reconstruction reference sample data respectively corresponding to the at least one sample image, and standard segmentation results respectively corresponding to the at least one sample image; and
   performing adversarial training on an initial segmentation model and an initial classification model based on the original sample image data respectively corresponding to the at least one sample image, the reconstruction reference sample data respectively corresponding to the at least one sample image, and the standard segmentation results respectively corresponding to the at least one sample image to obtain the target segmentation model and the target classification model.

5. The method according to claim 1, wherein the target dendritic tissue is a target neuron, and the target image is acquired from a three-dimensional brain image comprising the target neuron.

6. The method according to claim 1, wherein the target category of any pixel is used for indicating that the pixel belongs to a target neuron or that the pixel does not belong to the target neuron; and
   the reconstructing the target dendritic tissue in the target image based on the target segmentation result to obtain a complete reconstruction result of the target dendritic tissue in the target image comprises:
   determining target pixels belonging to the target neuron of the pixels in the target image based on the target segmentation result;
   marking neuron nodes of the target neuron and a connection relationship among the neuron nodes of the target neuron based on the target pixels to obtain a target marking result; and
   acquiring a complete reconstruction result of the target neuron in the target image based on the target marking result.

7. A computer device, comprising a processor and a memory, the memory storing at least one program code, the at least one program code being loaded and executed by the processor and causing the computer device to implement a method for reconstructing a dendritic tissue in an image, the method including:
   acquiring original image data corresponding to a target image of a target dendritic tissue, and reconstruction reference data corresponding to the target image, the reconstruction reference data being determined based on a local reconstruction result of the target dendritic tissue in the target image;
   applying a target segmentation model to the original image data and the reconstruction reference data to acquire a target segmentation result corresponding to the target image, the target segmentation result being used for indicating a target category of each pixel in the target image, and the target category of any pixel being used for indicating that the pixel belongs to the target dendritic tissue or that the pixel does not belong to the target dendritic tissue, wherein the target segmentation model is trained by: acquiring original sample image data respectively corresponding to at least one sample image, reconstruction reference sample data respectively corresponding to the at least one sample image, and standard segmentation results respectively corresponding to the at least one sample image: and performing supervised training on an initial segmentation model based on the original sample image data respectively corresponding to the at least one sample image, the reconstruction reference sample data respectively corresponding to the at least one sample image, and the standard segmentation results respectively corresponding to the at least one sample image to obtain the target segmentation model; and reconstructing the target dendritic tissue in the target image based on the target segmentation result to obtain a complete reconstruction result of the target dendritic tissue in the target image.

8. The computer device according to claim 7, wherein the applying a target segmentation model to the original image data and the reconstruction reference data to acquire a target segmentation result corresponding to the target image comprises:

performing a first reference number of times of downsampling processing in sequence based on fusion data of the original image data and the reconstruction reference data to obtain a first target feature corresponding to the target image;

performing the first reference number of times of upsampling processing in sequence based on a target convolution feature corresponding to the first target feature to obtain a second target feature corresponding to the target image; and performing target convolution processing on the second target feature to obtain the target segmentation result corresponding to the target image.

9. The computer device according to claim 7, wherein the method further comprises:

applying a target classification model the original image data and the target segmentation result to acquire target reconstruction confidence information.

10. The computer device according to claim 9, wherein the method further comprises:

acquiring original sample image data respectively corresponding to at least one sample image, reconstruction reference sample data respectively corresponding to the at least one sample image, and standard segmentation results respectively corresponding to the at least one sample image; and performing adversarial training on an initial segmentation model and an initial classification model based on the original sample image data respectively corresponding to the at least one sample image, the reconstruction reference sample data respectively corresponding to the at least one sample image, and the standard segmentation results respectively corresponding to the at least one sample image to obtain the target segmentation model and the target classification model.

11. The computer device according to claim 7, wherein the target dendritic tissue is a target neuron, and the target image is acquired from a three-dimensional brain image comprising the target neuron.

12. The computer device according to claim 7, wherein the target category of any pixel is used for indicating that the pixel belongs to a target neuron or that the pixel does not belong to the target neuron; and the reconstructing the target dendritic tissue in the target image based on the target segmentation result to obtain a complete reconstruction result of the target dendritic tissue in the target image comprises:

determining target pixels belonging to the target neuron of the pixels in the target image based on the target segmentation result;

marking neuron nodes of the target neuron and a connection relationship among the neuron nodes of the target neuron based on the target pixels to obtain a target marking result; and acquiring a complete reconstruction result of the target neuron in the target image based on the target marking result.

13. A non-transitory computer-readable storage medium, storing at least one program code, the at least one program code being loaded and executed by a processor of a computer device and causing the computer device to implement a method for reconstructing a dendritic tissue in an image, the method including:

acquiring original image data corresponding to a target image of a target dendritic tissue, and reconstruction reference data corresponding to the target image, the reconstruction reference data being determined based on a local reconstruction result of the target dendritic tissue in the target image;

applying a target segmentation model to the original image data and the reconstruction reference data to acquire a target segmentation result corresponding to the target image, the target segmentation result being used for indicating a target category of each pixel in the target image, and the target category of any pixel being used for indicating that the pixel belongs to the target dendritic tissue or that the pixel does not belong to the target dendritic tissue, wherein the target segmentation model is trained by: acquiring original sample image data respectively corresponding to at least one sample image, reconstruction reference sample data respectively corresponding to the at least one sample image, and standard segmentation results respectively corresponding to the at least one sample image: and performing supervised training on an initial segmentation model based on the original sample image data respectively corresponding to the at least one sample image, the reconstruction reference sample data respectively corresponding to the at least one sample image, and the standard segmentation results respectively corresponding to the at least one sample image to obtain the target segmentation model; and reconstructing the target dendritic tissue in the target image based on the target segmentation result to obtain a complete reconstruction result of the target dendritic tissue in the target image.

14. The non-transitory computer-readable storage medium according to claim 13, wherein the applying a target segmentation model to the original image data and the reconstruction reference data to acquire a target segmentation result corresponding to the target image comprises:

performing a first reference number of times of downsampling processing in sequence based on fusion data of the original image data and the reconstruction reference data to obtain a first target feature corresponding to the target image;

performing the first reference number of times of upsampling processing in sequence based on a target convolution feature corresponding to the first target feature to obtain a second target feature corresponding to the target image; and performing target convolution processing on the second target feature to obtain the target segmentation result corresponding to the target image.

15. The non-transitory computer-readable storage medium according to claim 13, wherein the method further comprises:

applying a target classification model the original image data and the target segmentation result to acquire target reconstruction confidence information.

16. The non-transitory computer-readable storage medium according to claim 15, wherein the method further comprises:

acquiring original sample image data respectively corresponding to at least one sample image, reconstruction reference sample data respectively corresponding to the at least one sample image, and standard segmentation results respectively corresponding to the at least one sample image; and performing adversarial training on an initial segmentation model and an initial classification model based on the original sample image data respectively corresponding to the at least one sample image, the reconstruction reference sample data respectively corresponding to the at least one sample image, and the standard segmentation results respectively corresponding to the at least one sample image to obtain the target segmentation model and the target classification model.

17. The non-transitory computer-readable storage medium according to claim 13, wherein the target category of any pixel is used for indicating that the pixel belongs to a target neuron or that the pixel does not belong to the target neuron; and the reconstructing the target dendritic tissue in the target image based on the target segmentation result to obtain a complete reconstruction result of the target dendritic tissue in the target image comprises:

determining target pixels belonging to the target neuron of the pixels in the target image based on the target segmentation result;

marking neuron nodes of the target neuron and a connection relationship among the neuron nodes of the target neuron based on the target pixels to obtain a target marking result; and acquiring a complete reconstruction result of the target neuron in the target image based on the target marking result.

* * * * *